US011768308B2

(12) United States Patent
Olsson et al.

(10) Patent No.: US 11,768,308 B2
(45) Date of Patent: Sep. 26, 2023

(54) SYSTEMS AND METHODS FOR ELECTRONICALLY MARKING, LOCATING AND VIRTUALLY DISPLAYING BURIED UTILITIES

(71) Applicant: SeeScan Inc., San Diego, CA (US)

(72) Inventors: Mark S. Olsson, La Jolla, CA (US); Michael J. Martin, San Diego, CA (US); Ray Merewether, La Jolla, CA (US); Stephanie M. Bench, Carlsbad, CA (US)

(73) Assignee: SeeScan, Inc., San Diego, CA (US)

( * ) Notice: Subject to any disclaimer, the term of this patent is extended or adjusted under 35 U.S.C. 154(b) by 699 days.

(21) Appl. No.: 15/846,102

(22) Filed: Dec. 18, 2017

(65) Prior Publication Data
US 2019/0004203 A1    Jan. 3, 2019

Related U.S. Application Data

(60) Provisional application No. 62/438,069, filed on Dec. 22, 2016, provisional application No. 62/435,681, filed on Dec. 16, 2016.

(51) Int. Cl.
| | |
|---|---|
| *G01V 3/08* | (2006.01) |
| *G01V 3/165* | (2006.01) |
| *G01V 15/00* | (2006.01) |
| *G01V 3/15* | (2006.01) |

(52) U.S. Cl.
CPC ............... *G01V 3/081* (2013.01); *G01V 3/15* (2013.01); *G01V 3/165* (2013.01); *G01V 15/00* (2013.01)

(58) Field of Classification Search
None
See application file for complete search history.

(56) References Cited

U.S. PATENT DOCUMENTS

| | | | |
|---|---|---|---|
| 5,122,750 | A | 6/1992 | Rippingale et al. |
| 7,009,399 | B2 | 3/2006 | Olsson et al. |
| 7,136,765 | B2 | 11/2006 | Maier et al. |

(Continued)

FOREIGN PATENT DOCUMENTS

EP    2804020 A2    11/2014

OTHER PUBLICATIONS

International Searching Authority, "Written Opinion of the International Searching Authority for PCT Patent Application No. PCT/US17/067120," dated Jun. 21, 2018, European Patent Office, Munich.

(Continued)

*Primary Examiner* — Jermele M Hollington
(74) *Attorney, Agent, or Firm* — Steven C. Tietsworth, Esq.; Michael J. Pennington, Esq.

(57) ABSTRACT

Systems and methods for electronically marking, locating, and virtually displaying buried utilities are disclosed. According to one embodiment, one or more electronic marker devices may be placed below a ground surface in proximity to a buried utility, and marker device data indicative of position and/or identity of such electronic marker devices may be obtained. The obtained marker device data may be associated to the utility data and stored in a database. The stored data may thereafter be retrieved based in part on the marker device data for use in subsequent locate operations and/or for other purposes.

22 Claims, 22 Drawing Sheets

(56) References Cited

U.S. PATENT DOCUMENTS

| | | |
|---|---|---|
| 7,221,136 B2 | 5/2007 | Olsson et al. |
| 7,276,910 B2 | 10/2007 | Prsha et al. |
| 7,288,929 B2 | 10/2007 | Prsha et al. |
| 7,319,387 B2 * | 1/2008 | Willson .................. G01V 15/00 340/539.1 |
| 7,332,901 B2 | 2/2008 | Olsson et al. |
| 7,336,078 B1 | 2/2008 | Merewether et al. |
| 7,443,154 B1 | 10/2008 | Merewether et al. |
| 7,518,374 B1 | 4/2009 | Olsson et al. |
| 7,557,559 B1 | 7/2009 | Olsson et al. |
| 7,619,516 B2 | 11/2009 | Olsson et al. |
| 7,733,077 B1 | 6/2010 | Merewether et al. |
| 7,741,848 B1 | 6/2010 | Olsson et al. |
| 7,755,360 B1 | 7/2010 | Martin |
| 7,825,647 B2 | 11/2010 | Olsson et al. |
| 7,830,149 B1 | 11/2010 | Olsson et al. |
| 7,969,151 B2 | 6/2011 | Bench |
| 7,990,151 B2 | 8/2011 | Olsson et al. |
| 8,013,610 B1 | 9/2011 | Merewether et al. |
| 8,203,343 B1 | 6/2012 | Olsson et al. |
| 8,248,056 B1 | 8/2012 | Olsson et al. |
| 8,264,226 B1 | 9/2012 | Olsson et al. |
| 8,400,154 B1 | 3/2013 | Olsson et al. |
| 8,547,428 B1 | 10/2013 | Olsson et al. |
| 9,057,754 B2 | 6/2015 | Olsson et al. |
| 9,081,109 B1 | 7/2015 | Olsson et al. |
| 9,082,269 B2 | 7/2015 | Olsson et al. |
| 9,085,007 B2 | 7/2015 | Olsson et al. |
| 9,341,740 B1 | 5/2016 | Olsson et al. |
| 9,411,067 B2 | 8/2016 | Olsson et al. |
| 9,435,907 B2 | 9/2016 | Olsson et al. |
| 9,465,129 B1 | 10/2016 | Olsson et al. |
| 9,488,747 B2 | 11/2016 | Olsson et al. |
| 9,599,449 B2 | 3/2017 | Merewether |
| 9,599,740 B2 | 3/2017 | Olsson |
| 9,625,602 B2 | 4/2017 | Olsson |
| 9,632,199 B2 | 4/2017 | Olsson et al. |
| 9,638,824 B2 | 5/2017 | Olsson et al. |
| 9,684,090 B1 | 6/2017 | Olsson et al. |
| 9,696,448 B2 | 7/2017 | Olsson et al. |
| 9,746,572 B2 * | 8/2017 | Olsson .................. G01V 3/15 |
| 9,784,837 B1 | 10/2017 | Olsson et al. |
| 9,891,337 B2 | 2/2018 | Olsson et al. |
| 9,927,545 B2 | 3/2018 | Olsson et al. |
| 9,928,613 B2 | 3/2018 | Olsson et al. |
| 9,959,641 B1 | 5/2018 | Olsson et al. |
| 10,024,994 B1 | 7/2018 | Cox et al. |
| 10,027,526 B2 | 7/2018 | Bench et al. |
| 10,031,253 B2 | 7/2018 | Olsson et al. |
| 10,042,072 B2 | 8/2018 | Olsson et al. |
| 10,059,504 B2 | 8/2018 | Olsson et al. |
| 10,069,667 B1 | 9/2018 | Bench et al. |
| 10,073,186 B1 | 9/2018 | Olsson et al. |
| 10,078,149 B2 | 9/2018 | Olsson et al. |
| 10,082,591 B1 | 9/2018 | Olsson et al. |
| 10,082,599 B1 | 9/2018 | Olsson et al. |
| 10,088,592 B1 | 10/2018 | Olsson et al. |
| 10,105,723 B1 * | 10/2018 | Olsson .................. B05B 12/122 |
| 10,162,074 B2 | 12/2018 | Olsson et al. |
| 10,247,845 B1 | 4/2019 | Merewether et al. |
| 10,274,632 B1 * | 4/2019 | Olsson .................. G01S 19/03 |
| 10,353,103 B1 | 7/2019 | Olsson et al. |
| 10,371,351 B2 | 8/2019 | Olsson et al. |
| 10,401,526 B2 | 9/2019 | Bench et al. |
| 11,280,934 B2 * | 3/2022 | Bench .................. G01R 29/085 |
| 11,397,274 B2 * | 7/2022 | Olsson .................. G01V 3/081 |
| 11,474,276 B1 * | 10/2022 | Aldridge .................. G01V 3/15 |
| 2006/0232259 A1 * | 10/2006 | Olsson .................. G01V 3/15 324/67 |
| 2010/0085185 A1 * | 4/2010 | Nielsen .................. G01V 3/15 340/540 |
| 2010/0188245 A1 * | 7/2010 | Nielsen .................. G01V 3/08 340/686.1 |
| 2013/0127470 A1 | 5/2013 | Olsson et al. |
| 2013/0200901 A1 | 8/2013 | Olsson et al. |
| 2014/0111376 A1 | 4/2014 | Bench et al. |
| 2014/0132270 A1 | 5/2014 | Olsson et al. |
| 2014/0167766 A1 | 6/2014 | Olsson et al. |
| 2014/0340086 A1 * | 11/2014 | Olsson .................. G01V 3/38 324/326 |
| 2015/0123664 A1 * | 5/2015 | Olsson .................. G01V 3/15 324/326 |
| 2015/0204995 A1 | 7/2015 | Olsson et al. |
| 2017/0131423 A1 | 5/2017 | Olsson et al. |
| 2017/0235010 A1 | 8/2017 | Olsson et al. |
| 2017/0363764 A1 * | 12/2017 | Aldridge .................. G01V 3/38 |
| 2018/0128931 A1 * | 5/2018 | Olsson .................. G01V 3/15 |
| 2021/0231833 A1 * | 7/2021 | Bench .................. H01Q 7/00 |

OTHER PUBLICATIONS

Jeong H.S. et al., "A Decision Tool for the Selection of Imaging Technologies to Detect Underground Infrastructure," Tunnelling and Underground Space Technology, Mar. 1, 2004, pp. 175-191, vol. 19, No. 2, XP004491264, ISSN: 0886-7798, DOI: 10/1016/J.TUST.2003.09.001, Elsevier Science Publishing, New York, NY, US.

* cited by examiner

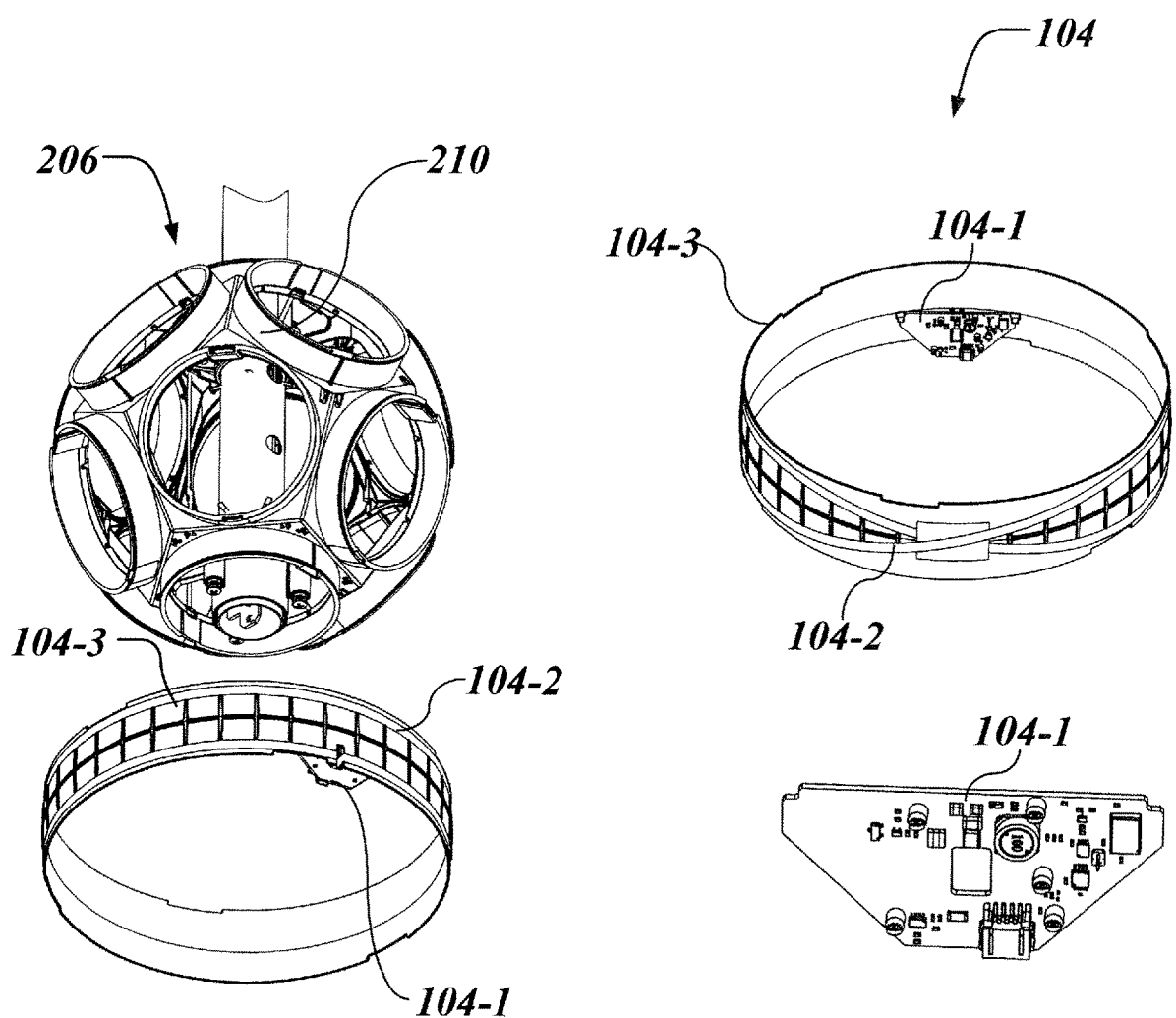
*FIG. 2B*  *FIG. 2C*

SYSTEMS AND METHODS FOR ELECTRONICALLY MARKING, LOCATING AND VIRTUALLY DISPLAYING BURIED UTILITIES

CROSS-REFERENCE TO RELATED APPLICATIONS

This application claims priority under 35 U.S.C. § 119(e) to U.S. Provisional Patent Application Ser. No. 62/438,069, entitled SYSTEMS AND METHODS FOR ELECTRONICALLY MARKING, LOCATING AND VIRTUALLY DISPLAYING BURIED UTILITIES, filed on Dec. 22, 2016, and U.S. Provisional Patent Application Ser. No. 62/435,681, entitled SYSTEMS AND METHODS FOR ELECTRONICALLY MARKING AND LOCATING BURIED UTILITY ASSETS, filed on Dec. 16, 2016. The content of each of these applications is hereby incorporated by reference herein in its entirety for all purposes.

FIELD

This disclosure relates generally to systems and methods for locating and/or marking buried utilities. More specifically, but not exclusively, the disclosure relates to systems and methods for marking buried utilities using electronic marker devices in conjunction with a buried utility locator, locating marked buried utilities, and virtually displaying the located buried utilities.

BACKGROUND

The evolving complexity of infrastructure requires precise known location and identification of utilities, such as utility lines (e.g., underground power lines, gas lines, phone lines, fiber optic cable conduits, cable television (CATV) cables, sprinkler control wiring, water pipes, sewer pipes, etc.) for purposes of enhancement, replacement, and/or repair. Such utility lines, collectively and individually which will herein be referred to as "buried utilities" or "buried utility assets" may be buried under the ground and/or otherwise hidden from normal sight. Construction and/or excavation operations may further require the locations and/or identification of such utility lines be known so as to avoid costly and hazardous destruction of infrastructure.

Traditionally, buried utilities are located by a technician carrying a portable magnetic field sensing locating device in hand over the ground surface, moving about a geographical region to detect buried utilities and determine the location of the buried utilities. The determined location is then typically marked by the technician using aerosol paint or flag(s), or other markers of a specific color on the ground surface to denote specific utilities. Such above-ground paint/flag markers provide visual indication of location of buried utilities for subsequent locate or excavation operations. Some underground utility installations use devices known as marker balls placed in the ground to provide an additional way to identify buried or hidden utilities. Such devices, though useful, provide only limited information about the location of the buried utilities, and above-ground paint/flag markers often chip off, fade away and are destroyed in a short period of time.

Accordingly, there is a need in the art to address the above-described as well as other problems related to marker devices and associated method and systems for marking and subsequent locating.

SUMMARY

This disclosure relates to systems and methods for electronically marking, locating, and virtually displaying buried utilities.

According to one aspect, a system for electronically marking buried utilities may include an electronic marker device placed below a ground surface in proximity to a buried utility, and a buried utility locator including an integrated marker excitation device configured to generate and provide a marker excitation signal to excite the placed marker device. When excited, the marker device may generate a response signal, which may be received by a front-end subsystem of the locator. Additionally, the locator front-end subsystem may receive magnetic field signals emitted from the buried utility. The received marker response signal may be processed at the locator to generate marker device data, which may be understood as data indicative of position and/or identity of the placed marker device, and the received magnetic fields from the buried utility may be processed to generate utility data, which may be understood as data indicative of position of the buried utility relative to the ground surface. The generated marker device data and the utility data may be transmitted to a computing device/system remotely coupled to the locator. At the computing device, an association module may receive the marker device data and the utility data, associate the marker device data to the utility data, and store the associated marker device data and the utility data into a non-transitory memory such that the utility data is retrievable from the memory based in part on the marker device data.

According to another aspect, a method for electronically marking buried utilities may include obtaining marker device data indicative of position and/or identity of an electronic marker device placed below a ground surface in proximity to a buried utility, and obtaining utility data indicative of position of the buried utility relative to the ground surface. The obtained marker device data may be associated to the utility data and stored in a non-transitory memory associated with a remote computing device. The association allows the utility data to be retrievable from the remote non-transitory memory based in part on the marking device data.

According to another aspect, a method of locating electronically marked buried utilities may include providing, from a buried utility locator, a marker excitation signal to energize an electronic marker device placed below a ground surface in proximity to a buried utility, receiving a marker response signal responsive to the marker excitation signal from the energized electronic marker device, and retrieving utility data corresponding to the energized marker device from a non-transitory memory. The method may further include displaying, virtually, the position of the buried utility on a display unit associated with the buried utility locator, wherein the position of the buried utility may be updated in real-time as the buried utility locator is being moved over the ground surface.

According to another aspect, a method of locating electronically marked buried utilities may include providing, from a buried utility locator, marker excitation signals to excite a plurality of marker devices placed below a ground surface in proximity to one or more buried utilities, and receiving, substantially simultaneously, marker response signals responsive to the marker excitation signals from the plurality of electronic marker devices. The method may further include cross-correlating the marker excitation signals with pre-stored data pertaining to the marker devices to individually identify each of the electronic marker devices, and retrieving, from a non-transitory memory, utility data, indicative of position of each of the one or more buried utilities, associated with each of the individually identified electronic marker devices. The positions may be virtually displayed to a user on a display unit associated with the locator, and such positions may be updated in real-time as the locator is being moved by a user over the ground surface.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying Drawings, wherein:

FIGS. 2A-2H illustrate various embodiments of the buried utility locator, its components and block diagrams.

DETAILED DESCRIPTION OF EMBODIMENTS

Overview

Figure 1A:
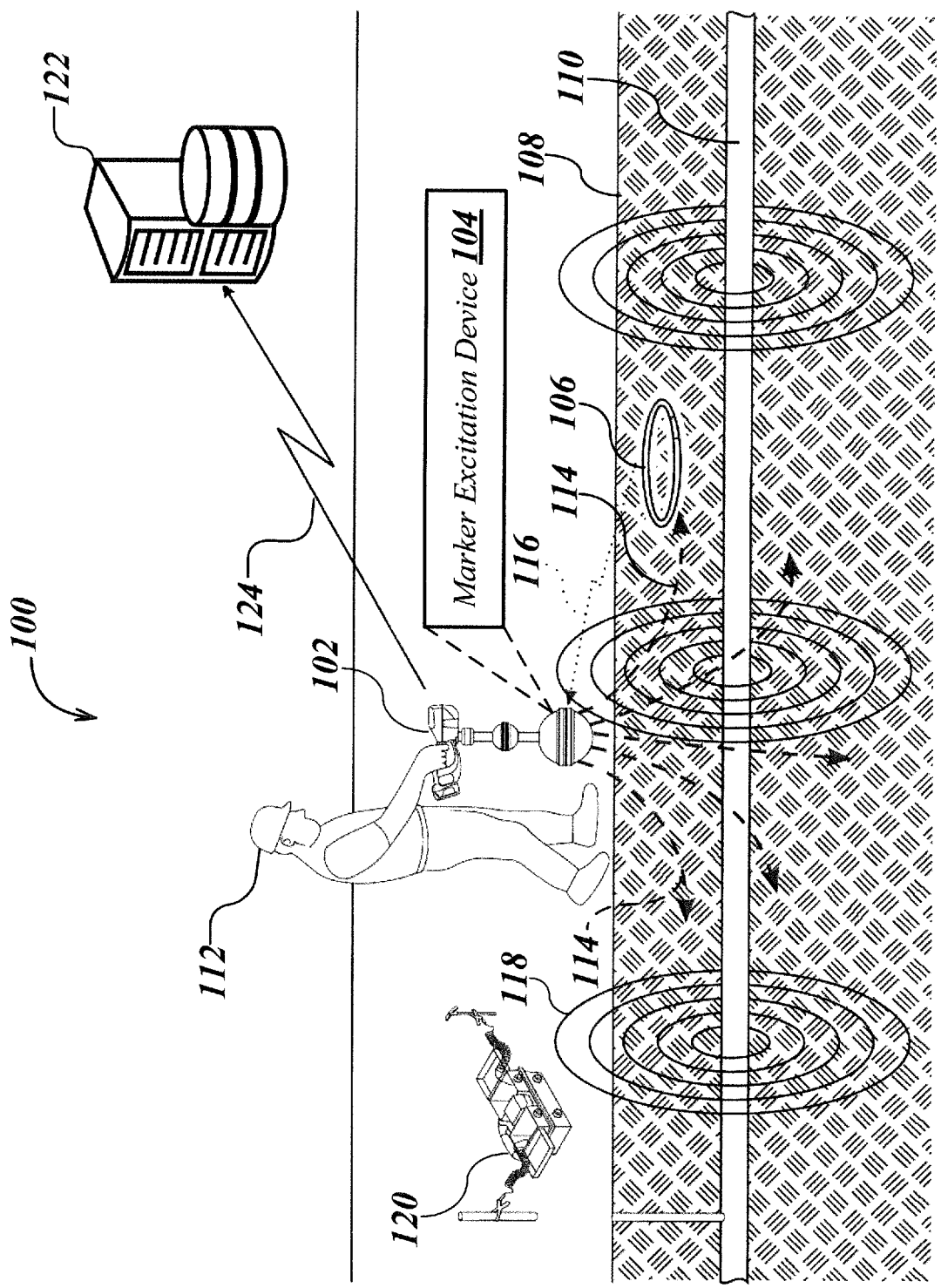
FIGS. 1A-1B illustrate an embodiment of a system for electronically marking, locating and virtually displaying buried utilities.

This disclosure relates generally to systems and methods for locating and marking buried utilities, and particularly relates to systems and methods for electronically marking buried utilities, locating the electronically marked buried utilities, and virtually displaying the located buried utilities.

In one aspect, the disclosure relates to systems and methods for electronically marking buried utilities using one or more electronic marker devices, and locating such buried utilities in conjunction with associated electronic marker devices. For example, the electronic marker device(s), which may include passive wireless markers capable of receiving/sending marker excitation signals, which may be radio frequency excitation signals, from/to a buried utility locator equipped with a marker excitation device (e.g., transmitter device for exciting/energizing electronic marker device(s)), may be placed below a ground surface in proximity to a buried utility. Information pertaining to such placed marker device(s) (e.g., identity of the marker device, position (including positional coordinates/compass position, orientation, depth, elevation, etc.) of the marker device, and the like) may be determined at the buried utility locator and/or other associated systems/devices or may be predetermined via physical measurements at the time of placement of such marker device(s) below the ground surface.

The information pertaining to the marker device may thereafter be associated with information (e.g., position (including positional coordinates/compass position, orientation, depth, elevation, etc.), characteristics of the buried utility and the like) pertaining to the buried utility, which may be determined at the buried utility locator and/or other associated systems/devices. The associated information/data may then be stored into a remotely coupled non-transitory memory, and a copy of such information (e.g., either entire information or a portion thereof) may also be stored or pre-loaded in a local memory of the locator, from which information pertaining to the buried utility may be retrieved based in part on the information related to the corresponding marker device. For example, in situations such as subsequent locate operations where a user/technician wants to find out the information, such as position of the buried utility, the user may use the buried utility locator (e.g., locator equipped with/coupled to marker excitation device) to generate and send marker excitation signals to energize the placed electronic marker device, and receive, in response, a marker response signal, which may be a radio frequency response signal, from the energized electronic marker device. This received marker response signal may then be processed at the buried utility locator to determine information, such as identity and/or position/location of the energized marker device to retrieve associated information (e.g., position, characteristics, etc.) pertaining to the buried utility from the local memory of the locator or the remotely coupled non-transitory memory. Position of the buried utility may be virtually displayed on a display unit of the locator and/or user device in conjunction with pre-stored images, videos, and textual information related to the buried utility that may also be displayed or overlaid on the display unit and/or communicated to a user using audio/sound devices, whereby such position, pre-stored images, videos, and/or textual information, may be updated in real-time based on corresponding movements of the buried utility locator above the ground surface.

Additional details and examples of the utility locator referred to herein, additional components, methods, and configurations that may be used in conjunction with the embodiments described subsequently herein are disclosed in co-assigned patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,332,901, issued Feb. 19, 2008, entitled LOCATOR WITH APPARENT DEPTH INDICATION; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,557,559, issued Jul. 7, 2009, entitled COMPACT LINE ILLUMINATOR FOR LOCATING BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 9,625,602, issued Apr. 18, 2017, entitled SMART PERSONAL COMMUNICATION DEVICES AS USER INTERFACES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKETS AND HELICAL COIL TYPE ELECTRICAL CORDS; U.S. Pat. No. 7,969,151, issued Jun. 28, 2011, entitled PRE-AMPLIFIER AND MIXER CIRCUITRY FOR A LOCATOR ANTENNA; U.S. Pat. No. 8,013,610, issued Sep. 6, 2011, entitled HIGH-Q SELF TUNING LOCATING TRANSMITTER; U.S. Pat. No. 8,203,343, issued Jun. 19, 2012, entitled RECONFIGURABLE PORTABLE LOCATOR EMPLOYING MULTIPLE SENSOR ARRAY HAVING FLEXIBLE NESTED ORTHOGONAL ANTENNAS; U.S. Pat. No. 8,248,056, issued Aug. 21, 2012, entitled BURIED OBJECT LOCATOR SYSTEM EMPLOYING AUTOMATED VIRTUAL DEPTH EVENT DETECTION AND SIGNALING; U.S. Pat. No. 9,599,499, issued Mar. 21, 2017, entitled SYSTEMS AND METHODS FOR LOCATING BURIED OR HIDDEN OBJECTS USING SHEET CURRENT FLOW MODELS; U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 9,638,824, issued May 2, 2017, entitled QUAD-GRADIENT COILS FOR USE IN LOCATING SYSTEMS; U.S. patent application Ser. No. 13/677,223, filed Nov. 14, 2012, entitled MULTI-FREQUENCY LOCATING SYSTEMS AND METHODS; U.S. patent application Ser. No. 13/769,202, filed Feb. 15, 2013, entitled SMART PAINT STICK DEVICES AND METHODS; U.S. patent application Ser. No. 13/774,351, filed Feb. 22, 2013, entitled DOCKABLE TRIPODAL CAMERA CONTROL UNIT; U.S. patent application Ser. No. 13/787,711, filed Mar. 6, 2013, entitled DUAL SENSED LOCATING SYSTEMS AND METHODS; U.S. Pat. No. 8,400,154, issued Mar. 19, 2013, entitled LOCATOR ANTENNA WITH CONDUCTIVE BOBBIN; U.S. Pat. No. 9,488,747, issued Nov. 8, 2016, entitled DUAL ANTENNA SYSTEMS WITH VARIABLE POLARIZATION; U.S. patent application Ser. No. 13/894,038, filed May 14, 2013, entitled OMNI-INDUCER TRANSMITTING DEVICES AND METHODS; U.S. patent application Ser. No. 13/958,492, filed Aug. 2, 2013, entitled OPTICAL ROUND TRACKING APPARATUS, SYSTEMS AND METHODS; U.S. Pat. No. 9,599,740, issued Mar. 21, 2017, entitled USER INTERFACES FOR UTILITY LOCATORS; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/077,022, filed Nov. 11, 2013, entitled WEARABLE MAGNETIC FIELD UTILITY LOCATOR SYSTEM WITH SOUND FIELD GENERATION; U.S. Pat. No. 8,547,428, issued Oct. 1, 2013, entitled PIPE MAPPING SYSTEM; U.S. Pat. No. 8,635,043, issued Jan. 21, 2014, entitled Locator and Transmitter Calibration System; U.S. patent application Ser. No. 14/332,268, filed Jul. 15, 2014, entitled UTILITY LOCATOR TRANSMITTER DEVICES, SYSTEMS, AND METHODS WITH DOCKABLE APPARATUS; U.S. patent application Ser. No. 14/446,145, filed Jul. 29, 2014, entitled UTILITY LOCATING SYSTEMS WITH MOBILE BASE STATION; U.S. Pat. No. 9,632,199, issued Apr. 25, 2017, entitled INDUCTIVE CLAMP DEVICES, SYSTEMS, AND METHODS; U.S. patent application Ser. No. 14/516,558, filed Oct. 16, 2014, entitled ELECTRONIC MARKER DEVICES AND SYSTEMS; U.S. patent application Ser. No. 14/580,097, filed Dec. 22, 2014, entitled NULLED-SIGNAL LOCATING DEVICES, SYSTEMS, AND METHODS; U.S. Pat. No. 9,057,754, issued Jun. 16, 2015, entitled ECONOMICAL MAGNETIC LOCATOR APPARATUS AND METHOD; U.S. patent application Ser. No. 14/752,834, filed Jun. 27, 2015, entitled GROUND TRACKING APPARATUS, SYSTEMS, AND METHODS; U.S. patent application Ser. No. 14/797,840, filed Jul. 13, 2015, entitled GROUND-TRACKING DEVICES AND METHODS FOR USE WITH A UTILITY LOCATOR; U.S. patent application Ser. No. 14/798,177, filed Jul. 13, 2015, entitled MARKING PAINT APPLICATOR FOR USE WITH PORTABLE UTILITY LOCATOR; U.S. Pat. No. 9,081,109, issued Jul. 14, 2015, entitled GROUND-TRACKING DEVICES FOR USE WITH A MAPPING LOCATOR; U.S. Pat. No. 9,082,269, issued Jul. 14, 2015, entitled HAPTIC DIRECTIONAL FEEDBACK HANDLES FOR LOCATION DEVICES; U.S. patent application Ser. No. 14/802,791, filed Jul. 17, 2015, entitled METHODS AND SYSTEMS FOR SEAMLESS TRANSITIONING IN INTERACTIVE MAPPING SYSTEMS; U.S. Pat. No. 9,085,007, issued Jul. 21, 2015, entitled MARKING PAINT APPLICATOR FOR PORTABLE LOCATOR; U.S. patent application Ser. No. 14/949,868, filed Nov. 23, 2015, entitled BURIED OBJECT LOCATOR APPARATUS AND SYSTEMS; U.S. patent application Ser. No. 15/006,119, filed Jan. 26, 2016, entitled SELF-STANDING MULTI-LEG ATTACHMENT DEVICES FOR USE WITH UTILITY LOCATORS; U.S. Pat. No. 9,341,740, issued May 17, 2016, entitled OPTICAL GROUND TRACKING APPARATUS, SYSTEMS, AND METHODS; U.S. Provisional Patent Application 62/350,147, filed Jun. 14, 2016, entitled TRACKABLE DIPOLE DEVICES, METHODS, AND SYSTEMS FOR USE WITH MARKING PAINT STICKS; U.S. Provisional Patent Application 62/352,731, filed Jun. 21, 2016, entitled SYSTEMS AND METHODS FOR UNIQUELY IDENTIFYING BURIED UTILITIES IN A MULTI-UTILITY ENVIRONMENT; U.S. Pat. No. 9,411,067, issued Aug. 9, 2016, entitled GROUND-TRACKING SYSTEMS AND APPARATUS; U.S. patent application Ser. No. 15/247,503, filed Aug. 25, 2016, entitled LOCATING DEVICES, SYSTEMS, AND METHODS USING FREQUENCY SUITES FOR UTILITY DETECTION; U.S. patent application Ser. No. 15/250,666, filed Aug. 29, 2016, entitled PHASE-SYNCHRONIZED BURIED OBJECT TRANSMITTER AND LOCATOR METHODS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. patent application Ser. No. 15/331,570, filed Oct. 21, 2016, entitled KEYED CURRENT SIGNAL UTILITY LOCATING SYSTEMS AND METHODS; U.S. patent application Ser. No. 15/339,766, filed Oct. 31, 2016, entitled GRADIENT ANTENNA COILS AND ARRAYS FOR USE IN LOCATING SYSTEMS; U.S. patent application Ser. No. 15/345,421, filed Nov. 7, 2016, entitled OMNI-INDUCER TRANSMITTING DEVICES AND METHODS; U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/376,576, filed Dec. 12, 2016, entitled MAGNETIC SENSING BURIED OBJECT LOCATOR INCLUDING A CAMERA; U.S. Provisional Patent Application 62/435,681, filed Dec. 16, 2016, entitled SYSTEMS AND METHODS FOR ELECTRONICALLY MARKING AND LOCATING BURIED UTILITY ASSETS; U.S. Provisional Patent Application 62/438,069, filed Dec. 22, 2016, entitled SYSTEMS AND METHODS FOR ELECTRONICALLY MARKING, LOCATING, AND DISPLAYING BURIED UTILITY ASSETS; U.S. patent application Ser. No. 15/396,068, filed Dec. 30, 2016, entitled UTILITY LOCATOR TRANSMITTER APPARATUS AND METHODS; U.S. Provisional Patent Application 62/444,310, filed Jan. 9, 2017, entitled DIPOLE-TRACKED LASER DISTANCE MEASURING DEVICE; U.S. patent application Ser. No. 15/425,785, filed Feb. 6, 2017, entitled METHODS AND APPARATUS FOR HIGH-SPEED DATA TRANSFER EMPLOYING SELF-SYNCHRONIZING QUADRATURE AMPLITUDE MODULATION (QAM); U.S. patent application Ser. No. 15/434,056, filed Feb. 16, 2017, entitled BURIED UTILITY MARKER DEVICES, SYSTEMS, AND METHODS; U.S. patent application Ser. No. 15/457,149, filed Mar. 13, 2017, entitled USER INTERFACES FOR UTILITY LOCATOR; U.S. patent application Ser. No. 15/457,222, filed Mar. 13, 2017, entitled SYSTEMS AND METHODS FOR LOCATING BURIED OR HIDDEN OBJECTS USING SHEET CURRENT FLOW MODELS; U.S. patent application Ser. No. 15/457,897, filed Mar. 13, 2017, entitled UTILITY LOCATORS WITH RETRACTABLE SUPPORT STRUCTURES AND APPLICATIONS THEREOF; U.S. patent application Ser. No. 15/470,642, filed Mar. 27, 2017, entitled UTILITY LOCATING APPARATUS AND SYSTEMS USING MULTIPLE ANTENNA COILS; U.S. patent application Ser. No. 15/470,713, filed Mar. 27, 2017, entitled UTILITY LOCATORS WITH PERSONAL COMMUNICATION DEVICE USER INTERFACES; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION (QAM); U.S. patent application Ser. No. 15/485,082, filed Apr. 11, 2017, entitled MAGNETIC UTILITY LOCATOR DEVICES AND METHODS; U.S. patent application Ser. No. 15/485,125, filed Apr. 11, 2017, entitled INDUCTIVE CLAMP DEVICES, SYSTEMS, AND METHODS; U.S. patent application Ser. No. 15/490,740, filed Apr. 18, 2017, entitled NULLED-SIGNAL UTILITY LOCATING DEVICES, SYSTEMS, AND METHODS; U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES; and U.S. patent application Ser. No. 15/590,964, filed May 9, 2017, entitled BORING INSPECTION SYSTEMS AND METHODS. The above applications may be collectively denoted herein as the "co-assigned applications" or "incorporated applications."

As used herein, the terms "buried utility assets," "buried utilities", "utilities," and "utility lines" include utilities below the surface of the ground and utilities that are otherwise obscured, covered, or hidden from direct view or access, such as within walls, cavities, etc. In a typical application a buried object is a pipe, cable, conduit, wire, or other object made of a conductive material (e.g., metal, metal alloys, etc.) or a non-conductive material, (e.g., plastic, concrete, ceramic, etc.) buried under the ground surface, at a depth of from a few centimeters to meters or more, that a user, such as a utility company employee, construction company employee, homeowner, or other wants to locate, map (e.g., by the position), and/or provide a surface mark of using paint, electronic marking techniques, or other identification or mapping techniques. Example utilities include water or other fluid pipelines, sewer lines, electrical power lines, electrical or optical signaling lines, gas lines, and the like.

In the context of the present disclosure, the term "position" refers to a location in space which is represented in the form of an absolute position, such as GPS positional coordinates (e.g., Latitude and Longitude), and/or relative position, such as position of a magnetic compass needle relative to an object/location (e.g., buried utility, marker device, landmark, etc.). Further, the term "position" as used herein in association with the marker device(s), buried utilities, and/or other objects includes an orientation (e.g., tilt, rotation, compass needle orientation, etc.), depth, and/or elevation of such objects with respect to a reference (e.g. locator, electronic marker device, landmark, ground surface, sea level, etc.). Furthermore, the term "position" may also include other parameters indicative of position/location of such objects typically represented in a three-dimensional (X, Y, Z coordinates or their equivalent) space.

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure. As used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

In one aspect, the present disclosure relates to systems and methods of electronically marking, locating, and virtually displaying buried or hidden utilities.

In another aspect, the present disclosure relates to systems and methods for electronically marking buried utilities using one or more electronic marker devices, locating such buried utilities in conjunction with associated electronic marker devices, and virtually displaying the located buried utilities.

In another aspect, the present disclosure relates to systems and methods for electronically marking a non-conductive utility using one or more electronic marker devices, locating the non-conductive utility in conjunction with associated electronic marker devices, and virtually displaying the located non-conductive utility.

In another aspect, the present disclosure relates to systems and methods of implementing a locator equipped with an integrated marker excitation device, configured to send/receive signals to/from the electronic marker device(s) as well as receive signals emitted from the buried utility, and determine information (e.g., identity, position, and other measurements) pertaining to the electronic marker device(s) and information (e.g., position, characteristics, etc.) pertaining to the buried utility.

In another aspect, the present disclosure relates to systems and methods of implementing a remote computing device or server for associating the information pertaining to the electronic marker device(s) with the information pertaining to the buried utility and storing the associated information/data into a non-transitory memory or database associated with the remote computing device, such that the information pertaining to the buried utility may be retrieved (e.g., for future locate operation) from the non-transitory memory based in part on the information pertaining to the marker device.

In another aspect, the present disclosure relates to systems and methods of storing a local copy of the associated information pertaining to the electronic marker device(s) and the buried utility into a local memory of the locator, or downloading/pre-loading either a portion of or all of the associated information from the remote non-transitory memory into the local memory of the locator such that the information pertaining to the buried utility may be retrieved (e.g., for future locate operations) from the local memory of the locator, if available. Otherwise, such information may be retrieved, in real time, from the remote non-transitory memory.

In another aspect, the present disclosure relates to virtually displaying real-time position of the located buried utilities on a display unit based on corresponding movements of the buried utility locator above the ground surface.

In another aspect, the present disclosure relates to virtually displaying real-time position of welded buried utilities and the corresponding X-ray image of the weld site upon detection of the leakage or other faults in the welded buried utilities.

In another aspect, the present disclosure relates to systems of electronically marking buried utilities. The system may include an electronic marker device, which may be placed below a ground surface in proximity to a buried utility (or other underground objects of interest), and a buried utility locator that includes or is used in conjunction with a marker excitation device configured to generate and provide a marker excitation signal to the placed electronic marker device. The system may further include a locator front-end subsystem configured to receive a marker response signal from the electronic marker device that is responsive to the marker excitation signal. Additionally, the locator front-end subsystem may be configured to also receive magnetic field signals emitted from the buried utility. A processing element within the system may be configured to process the received marker response signal obtained from the electronic marker device to generate marker device data indicative of position and identity of the placed electronic marker device.

Further, the processing element may be configured to process the magnetic field signals obtained from the buried utility locator to generate utility data indicative of position of the buried utility relative to the ground surface. The generated marker device data and the utility data may be received by a remote computing device which may be communicatively coupled to the locator. Such a remote computing device associates the marker device data to the utility data, and stores the associated marker device data and the utility data into a non-transitory memory associated with the remote computing device, such that the utility data may be retrievable from the non-transitory memory based on the marker device data for subsequent locate operations.

In another aspect, the present disclosure relates to methods of electronically marking buried utilities which may include obtaining marker device data indicative of position and identity of an electronic marker device placed below a ground surface in proximity to a buried utility and utility data indicative of position of the buried utility relative to the ground surface. Further, the method may include associating the obtained marker device data to the utility data, and storing the associated marker device data and the utility data in a non-transitory memory associated with a remote computing device, such that the utility data may be retrievable from the non-transitory memory based in part on the marking device data. In one example, a portion of, or all of the data stored in the non-transitory memory may be pre-loaded into a local memory of the buried utility locator and may be retrieved therefrom to virtually locate the buried utility.

In another aspect, the present disclosure relates to methods of locating electronically marked buried utilities assets, which may include providing, from a buried utility locator, a marker excitation signal to energize an electronic marker device placed below a ground surface in proximity to a buried utility (or other underground objects of interest), receiving, at the buried utility locator, a marker response signal responsive to the marker excitation signal from the energized electronic marker device, and retrieving, from a non-transitory memory, utility data corresponding to the energized marker device, wherein the utility data is indicative of position of the buried utility. The method may include displaying, virtually, the position of the buried utility on a display unit associated with the buried utility locator, wherein the position of the buried utility is updated in real-time as the buried utility locator is being moved on the ground surface. The buried utility referred to herein may be of a non-conductive material. Further, the non-transitory memory referred to herein may be a local memory of the buried utility locator, in one example, which contains pre-loaded utility data associated with the electronic marker device. In an alternate example, the non-transitory memory may be associated with a remote computing device that is operatively coupled to the buried utility locator. Furthermore, the display unit referred to herein may be located within the buried utility locator or user device coupled to the buried utility locator.

In another aspect, the present disclosure relates to methods of locating electronically marked buried utilities assets which may include providing marker excitation signals to excite a plurality of marker devices placed below a ground surface in proximity to one or more buried utilities, and receiving, substantially simultaneously, marker response signals responsive to the marker excitation signals from the plurality of electronic marker devices. The method may include cross-correlating the marker excitation signals with pre-stored data pertaining to the marker devices to individually identify each of the electronic marker devices, and retrieving, from a non-transitory memory, utility data, indicative of the position of each of the one or more buried utilities relative to the ground surface, associated with each of the individually identified electronic marker devices. The positions, in one example, may then be displayed virtually to a user on a display unit associated with the buried utility locator, and such positions may be updated in real-time as the buried utility locator is being moved by a user on the ground surface.

In another aspect, the present disclosure relates to locating an electronically marked buried utility based on energizing corresponding marker device(s) and retrieving associated absolute position and/or relative position of the buried utility stored in a remote non-transitory memory or a local memory of the locator for locating the buried utility, where locating may be based on either the absolute position, relative position, or a combination of both.

Various additional aspects, features, and functionality are further described below in conjunction with the appended Drawings.

Example Embodiments

Figure 1B:
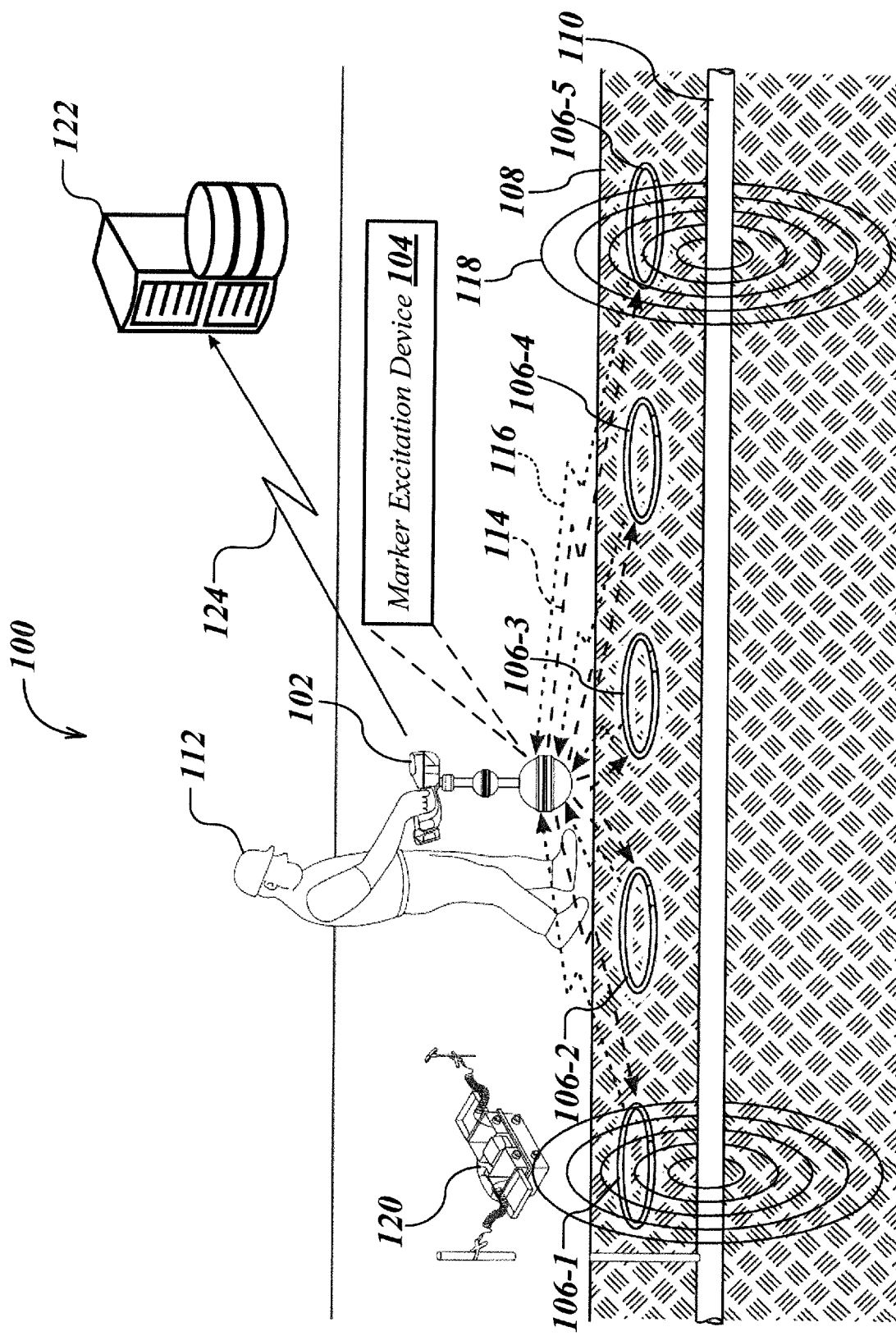

Details of example embodiments of a system 100 for electronically marking, locating, and virtually displaying buried utilities are shown in FIGS. 1A and 1B.

As shown in FIG. 1A, system 100 may include a buried utility locator 102 (interchangeably referred to as a "locator" for brevity) having a marker excitation device 104, which, in this example, is integrated into the locator 102, and which may be used to detect an electronic marker device 106 (interchangeably referred to as "marker device" for brevity) buried below a ground surface 108 or otherwise on or within other objects or structures in proximity to a buried utility 110. Locator 102 may also be configured to perform standard locate operations (e.g., locating one or more buried or hidden utilities, such as is described in the incorporated applications). The ground surface 108 referred to herein may be a roadway, in a yard or field, dirt or grass, a paved surface, a sidewalk, a building floor, and the like.

In another embodiment of system 100 illustrated in FIG. 1B, a plurality of marker devices, such as marker devices 106-1, 106-2, 106-3, 106-4 and 106-5, (collectively referred to as marker devices 106), may be buried below the ground surface 108, for example, along the length of the buried utility 110 at predetermined periodic or non-periodic intervals or at random intervals or spacing. In this embodiment, buried utility locator 102 equipped with integrated marker excitation device 104 may be configured to detect the plurality of marker devices 106, as well as perform standard locate operations. This may be advantageous in situations where the buried utility 110 is made of a non-conductive material (e.g., plastics) and therefore placement of the marker devices 106 along the length of such utility 110 may be used as an indicator to locate such utility 110 in subsequent locate operations.

In certain aspects, the marker excitation device 104, which has been described above as an integrated device may be configured as a separate portable standalone device, or an accessory device detachably attached to the locator 102, or integrated within/attached to other device(s) such as a user device including smartphone, tablet computer, personal digital assistant (PDA), etc., or a positioning device such as a GPS controller, according to other embodiments of the system 100.

In operation, a user 112 traverses the ground surface 108 with the locator 102 equipped with the marker excitation device 104, which detects both the buried utility 110 as well as the marker device(s) 106, typically (but not necessarily) simultaneously. In some embodiments the locator may both detect utilities based on magnetic field signals emitted therefrom and simultaneously excite the marker devices via marker excitation device 104. For example, the locator 102 equipped with the marker excitation device 104 sends marker excitation signals 114 (interchangeably referred to as "excitation signals"), which may be radio frequency continuous wave (CW) signals or pulsed signals or data encoded signals generated by the marker excitation device 104, to energize or excite one or more marker device(s) 106 placed in or under the ground surface 108 in proximity to the buried utility 110. Upon receiving the marker excitation signals 114, the marker device(s) 106 converts part of the received signal to energy for powering the device (e.g., rings up in energy) when tuned to the frequency of the marker excitation signals 114 to generate a marker response signal 116 (interchangeably referred to as "response signal"), which may be radio frequency response signal received and then processed at the locator 102 to determine data related to position (e.g., positional coordinates, orientation, depth, elevation etc., of the marker device relative to the ground) and/or identity (e.g., serial code, unique marker identifier, or non-unique marker identifier) of the marker device(s) 106. The locator 102 may include, in one aspect, various position sensing modules (not shown) such as satellite positioning receiver modules, for example, a GPS receiver module, GLONASS receiver module, etc., and other satellite or terrestrial navigation receiver modules for generating positional coordinates of the marker device(s) 106 based on the marker response signal 116. Such data related to position and/or identity of the marker device(s) 106 may be referred to subsequently herein as "marker device data."

The marker device data may include data determined manually by a user 112 via physical measurements (e.g., using tape, rod, laser, photos, etc.) and/or using the locator 102 and/or other associated devices/apparatus/systems. Such marker device data may be determined, for example, at the time of placement of the marker device 106 in proximity to the buried utility 110, and may be stored in the memory of the locator 102 and/or other associated devices/apparatus/systems. The placement may occur, for instance, during installation of the utility line, pipeline, surveys, excavation and/or locate operations.

Figure 1C:
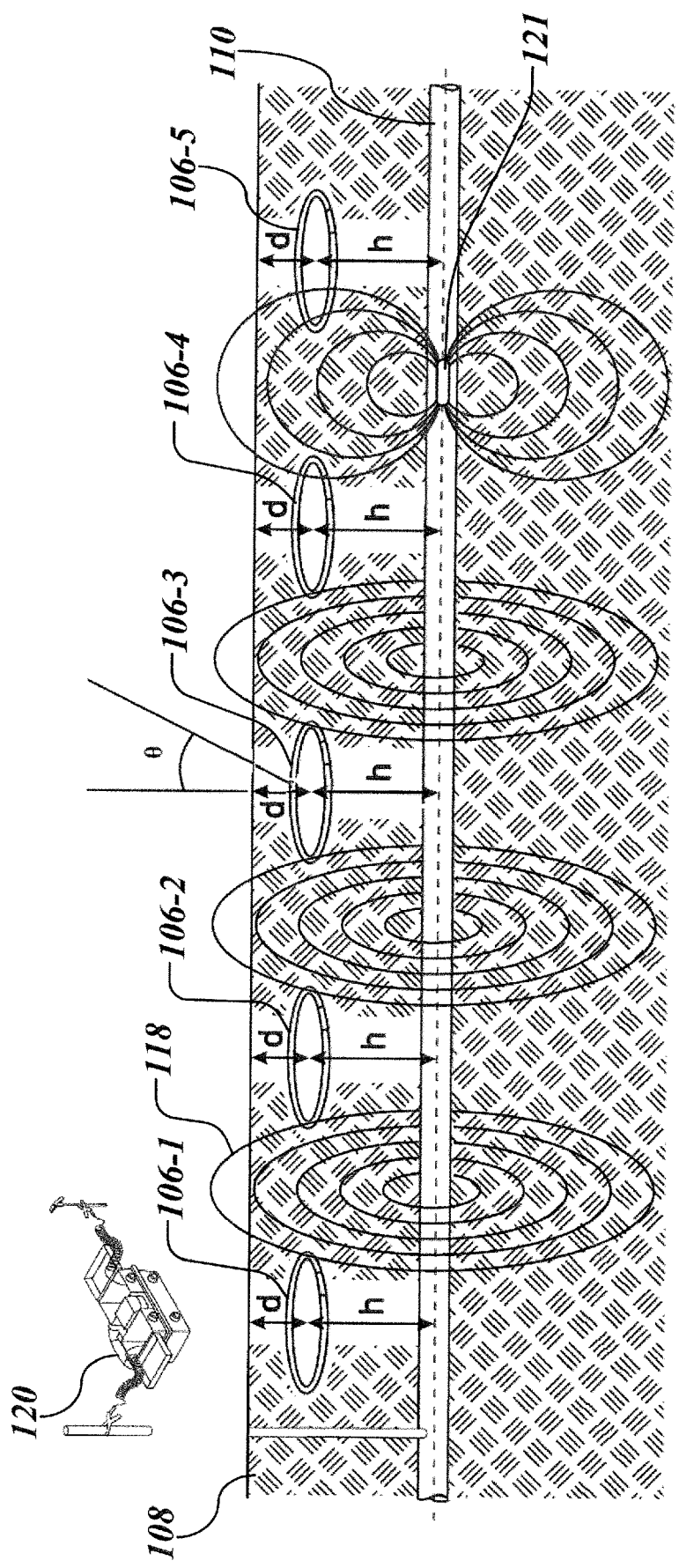
FIGS. 1C-1D illustrate an embodiment of the placement of electronic marker device(s) with respect to the buried utility.

The marker device(s) 106 may be placed, for example, at a height (h) above the buried utility 110, as shown in FIG. 1C. In other embodiments, the marker device(s) 106 may be placed at a height (h) below the buried utility 110 (not shown). The height (h) may refer to the height of the marker device(s) 106 from a centerline of the buried utility 110 (as shown in the FIG. 1C) or top of the buried utility 110 (not shown).

In some aspects, multiple different heights (e.g., $h_1$ and $h_2$, not shown) may be measured, for example, from the centerline (e.g., $h_1$) as well as the top (e.g., $h_2$) of the buried utility 110. The height (h), as described herein, may be a predetermined height or a random height, which may be the same or different for the individual marker device(s) 106. For example, height (h) may be determined for the marker device(s) 106 based on depth of the utility, type of the utility, type of ground surface, soil conditions, and/or several other factors.

The marker device(s) 106 may be placed at a depth (d) below the ground surface 108, as shown in the FIG. 1C, and may be oriented at an angle of orientation (θ) from the ground surface 108 and additionally or alternatively, at another angle of orientation (θ) from the buried utility 110. This depth (d) and angle of orientation (θ) may be a predetermined/random depth and angle of orientation (θ) which may be the same or different for individual marker device(s) 106.

Figure 1D:
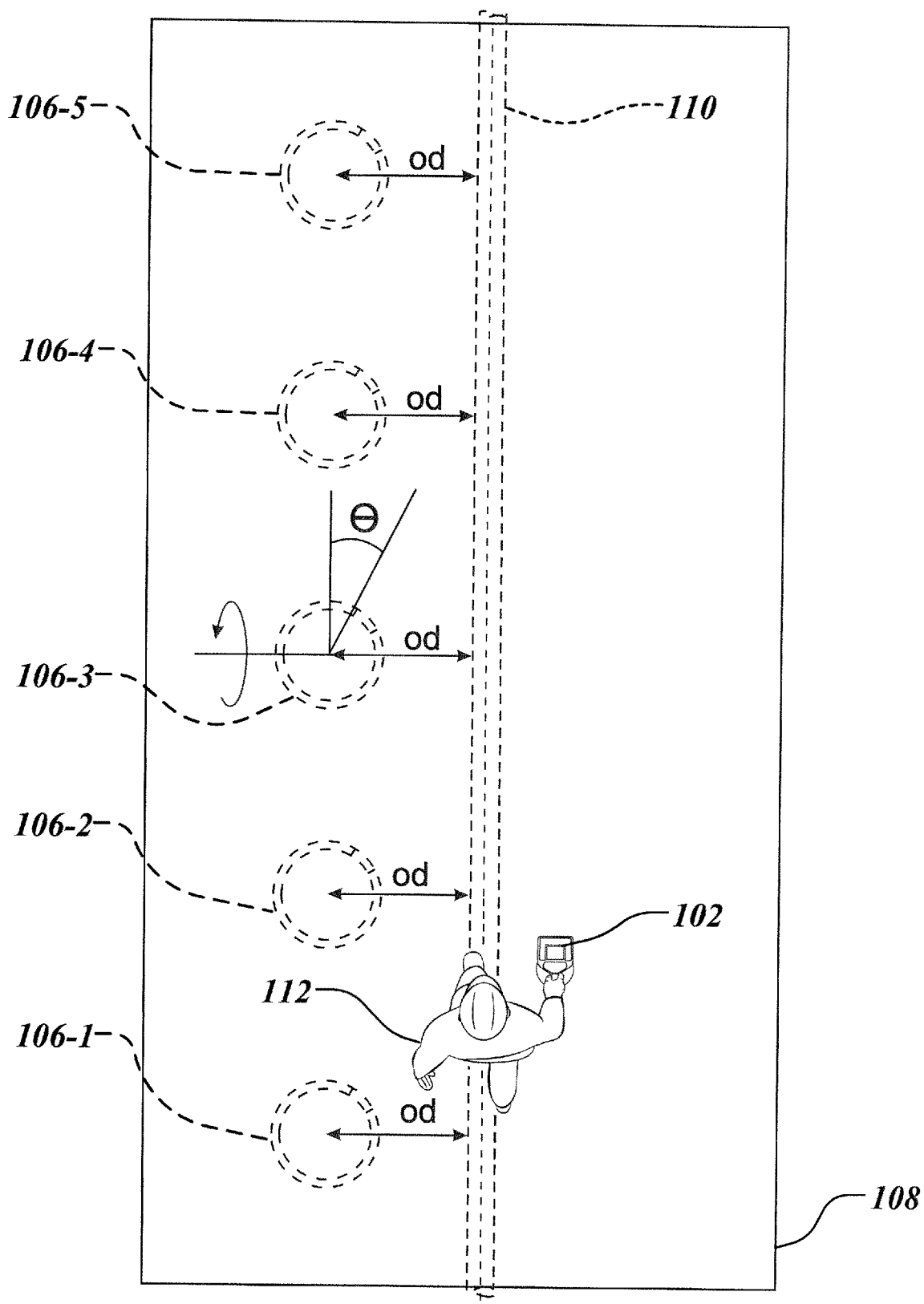

In some embodiments, the marker device(s) 106 may be placed offset (e.g., left offset or right offset) from the buried utility 110 at an offset distance (od), as shown in the FIG. 1D. This offset distance (od) may be a predetermined distance which may be the same or different for individual marker device(s) 106. The marker device(s) 106 may be placed left offset from the buried utility 106 and/or right offset from the buried utility 106 in a variety of combinations and patterns, not particularly limited to the ones shown in the appended drawing figures.

The locator 102 may be configured to sense signals from more than one marker device 106 substantially simultaneously. In addition to sensing signals from marker device(s) 106, the locator 102 may also sense magnetic field signals 118 emitted from one or more buried utilities, such as the buried utility 110 (due to normal current flow in a conductor, such as in a buried power line, or in some other conductor carrying an induced current), as shown in FIGS. 1B and 1C. The utility may optionally have a current flow coupled to it through the use of a device known as a utility locator transmitter (also denoted as a "transmitter" for brevity), such as transmitter 120 and associated devices as shown. Example details of various transmitter embodiments are described in the incorporated applications.

In some cases, current signals that generate magnetic field signals 118 detectable by the locator 102 may be induced into the utility 110 via overhead or underground power lines, radio signals, or other electromagnetic field sources. The current signals may also be induced into the utility 110 using additional devices such as Sondes (e.g., Sonde 121 shown in FIG. 1C), trace wires, induction sticks, induction clamps, "drop the box" induction, or other conductors, which may be inserted, clamped or coupled to the utility 110 (e.g., trace wires and the like). For example, in the case a buried utility 110 is made of non-conductive materials (e.g., plastics), current signals may be induced to locate the buried utility 110 using various methods, devices/apparatus, such as inserting Sondes or other energized conductors, etc., and/or using Ground-penetrating radar (GPR), acoustic, microwave techniques or a combination thereof, described in the incorporated applications.

When AC current flows in the utility 110 it generates corresponding magnetic field signals 118, which may be detected by the locator 102, and may subsequently be processed in the locator 102 to determine utility data, such as position/location including depth and orientation of the utility 110 relative to the ground surface 108, current flow in the utility 110, presence of other utilities or conductive objects in the vicinity, and the like, associated with the utility 110 and/or its surrounding environment.

Various position sensing modules (e.g., GPS receiver module, GLONASS receiver module, etc.) within the locator 102 may generate positional data (e.g., relative or absolute position information/coordinates) of the buried utility 110 based on the magnetic field signals 118. The locator 102 may be configured to simultaneously detect, receive, and/or process signals obtained from the marker device 106 and those emitted from the buried utility 110, to generate marker device data as well as utility data. The utility data may be predetermined data which may be obtained by the locator 102 from one or more data sources, such as preconfigured database(s), users, other entities, etc., locator determined data, or a combination of both. The utility data may also be determined by the locator 102 through other techniques and/or methods and using other devices/apparatus/systems, etc., such as those described in the incorporated applications. The utility data may also include data determined manually by a user 112 or otherwise communicated/provided to the user 112 from other sources.

The locator 102 may then transmit the marker device data and utility data to a remote computing device 122 communicatively coupled to the locator 102 via a suitable communication channel 124, which in this example, is a wireless communication channel (however, other communications channels may also be used). Upon receiving such data, the remote computing device 122 generates an association between the marker device data and the utility data according to which the marker device data may be associated to the utility data and stored into a remote non-transitory memory, which may be an internal memory of the remote computing device 122 and/or an external memory coupled to the remote computing device 122. The locator 102 may be configured to store the marker device data and corresponding utility data in a local memory of the locator 102 and additionally or alternatively, the locator 102 may be configured to download/pre-load a portion of or entire associated marker device data and the utility data from the remote database into its local memory for achieving a faster data retrieval rate. Both the local memory and the remote database, as described herein, are typically non-transitory data storage memories.

During future locate operations or for other purposes, when information such as location/position of the buried utility 110 may be desirable or required, such information may be obtained by energizing the marker device(s) 106 and retrieving information pertaining to the utility 110 buried in proximity to such marker device(s) 106 from the local memory of the locator and/or remote non-transitory memory based upon the identity and/or position of the energized marker device(s) 106. Such information (e.g., position etc.) pertaining to the buried utility 110 may then be displayed on a display unit associated with the locator 102, whereby the displayed information may be updated in real-time based upon corresponding movements of the locator 102 on the ground surface 108.

Various details of the locator 102 embodiment with an integrated marker excitation device 104 embodiment are described below with reference to FIGS. 2A-2H.

Figure 2A:
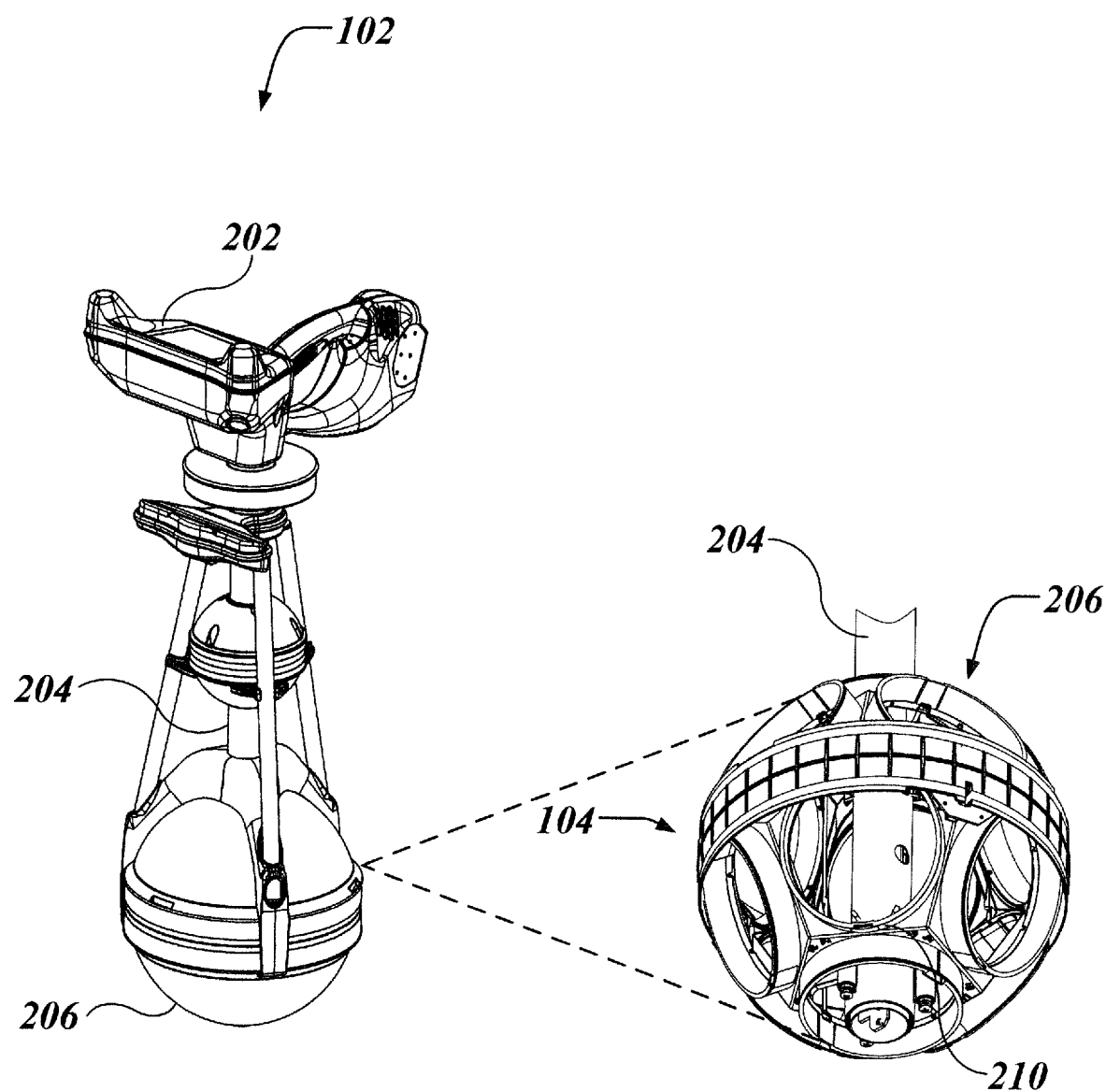

As shown in FIG. 2A, locator 102 may include a head unit 202, a central mast 204, and one or more spherical nodes including a front end node 206 (typically referred to as an antenna node), which may be molded to be coupled around the central mast 204 or disposed on or within the body of the locator 102 in various configurations. The front end node 206 may include one or more antennas 210 (interchangeably referred to as locator antennas 210) typically in the form of antenna coils (as shown in FIGS. 2A and 2B) which may be nested. For example, some of the antenna coils may be positioned in three orthogonal directions and others in a gradient antenna array, with a marker excitation device 104 (e.g., integrated marker excitation device) mounted in proximity to the antennas 210. Such a marker excitation device 104 is configured to generate marker excitation signal(s) to be provided to the marker device 106. Although the description hereinafter and/or figures mostly refer to/illustrate specific configuration(s) of the marker excitation device 104, such configuration(s) should not be construed as limiting but rather as exemplary. Marker excitation device 104, according to various aspects, may be in various configurations and may be provided either as an internal device mounted within the locator 102 or an external device such as a standalone device to be held by the user or an accessory/attachment device that may suitably attach to the locator 102.

In the example illustrated in FIG. 2C, marker excitation device embodiment 104 includes an electrical circuit 104-1, which in this example is a printed circuit board (PCB) mounted on an inside portion of a marker ring 104-3 disposed in the front end node 206 where two hemispherical portions of the front end node 206 mate together, with an antenna 104-2 coupled to the electrical circuit 104-1. The antenna 104-2, in one example (as shown in the FIG. 2C), may be coiled around an outer peripheral region of the marker ring 104-3 with its ends connected to the electrical circuit 104-1.

The head unit 202 of locator 102 may contain analog and/or digital electronic circuitry to receive and process signals from antennas, and other inputs, such as audio inputs, camera signals, and the like. Head unit 202 may also include display, control and/or user interface components, such as one or more visual displays, speakers and/or headphone interfaces, switches, touchscreen elements, one or more camera elements, and the like. The head unit 202 may also include one or more processing element(s), which are devices or apparatus configured to carry out programmable steps and/or other functions associated with the methods described herein by processing instructions, typically in the form of coded or interpreted software instructions. The electronic circuitry further includes location/position navigation modules, external data communication modules, as well as additional modules as shown and described herein.

Figure 2D:
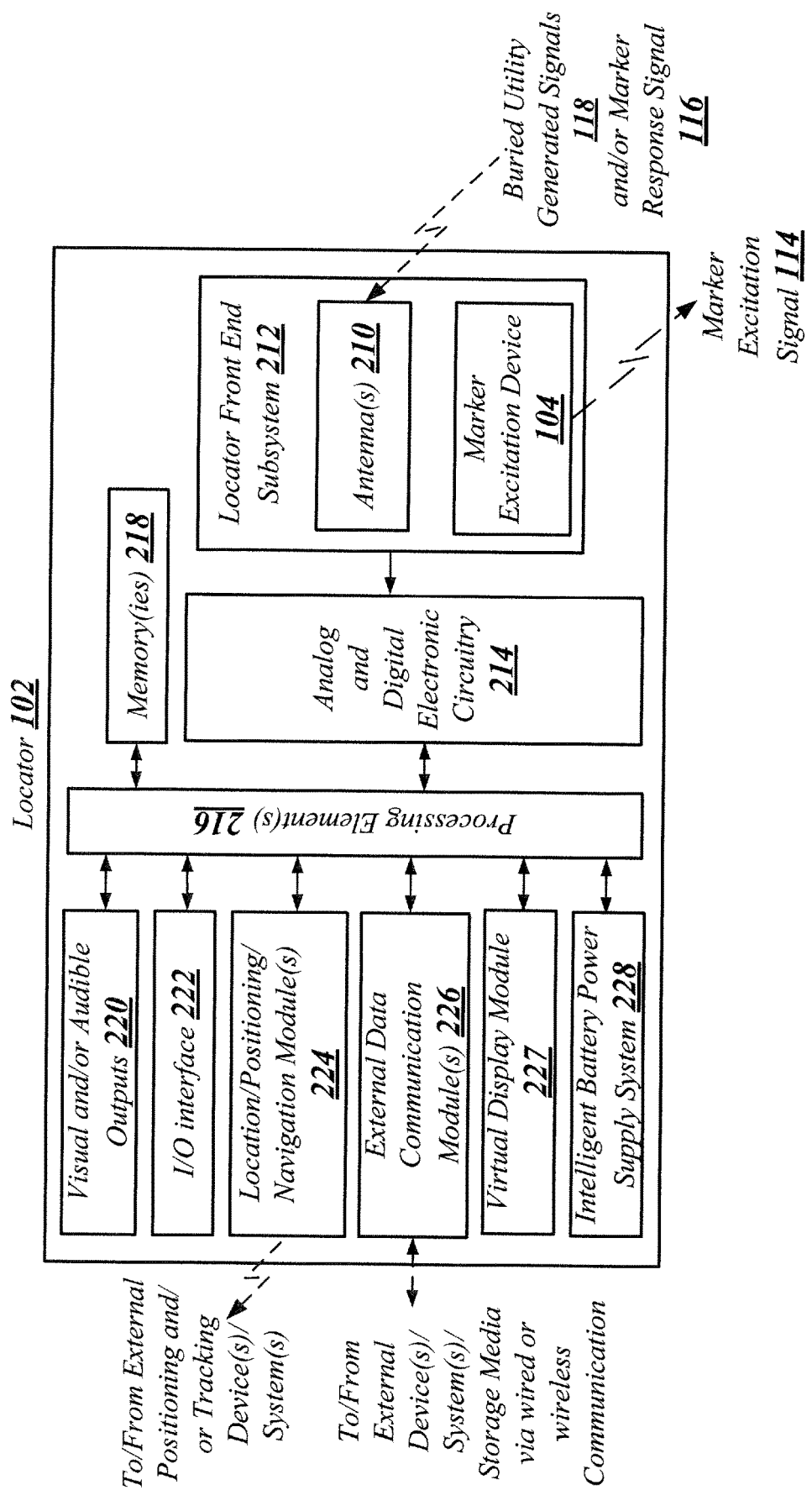
Figure 2E:
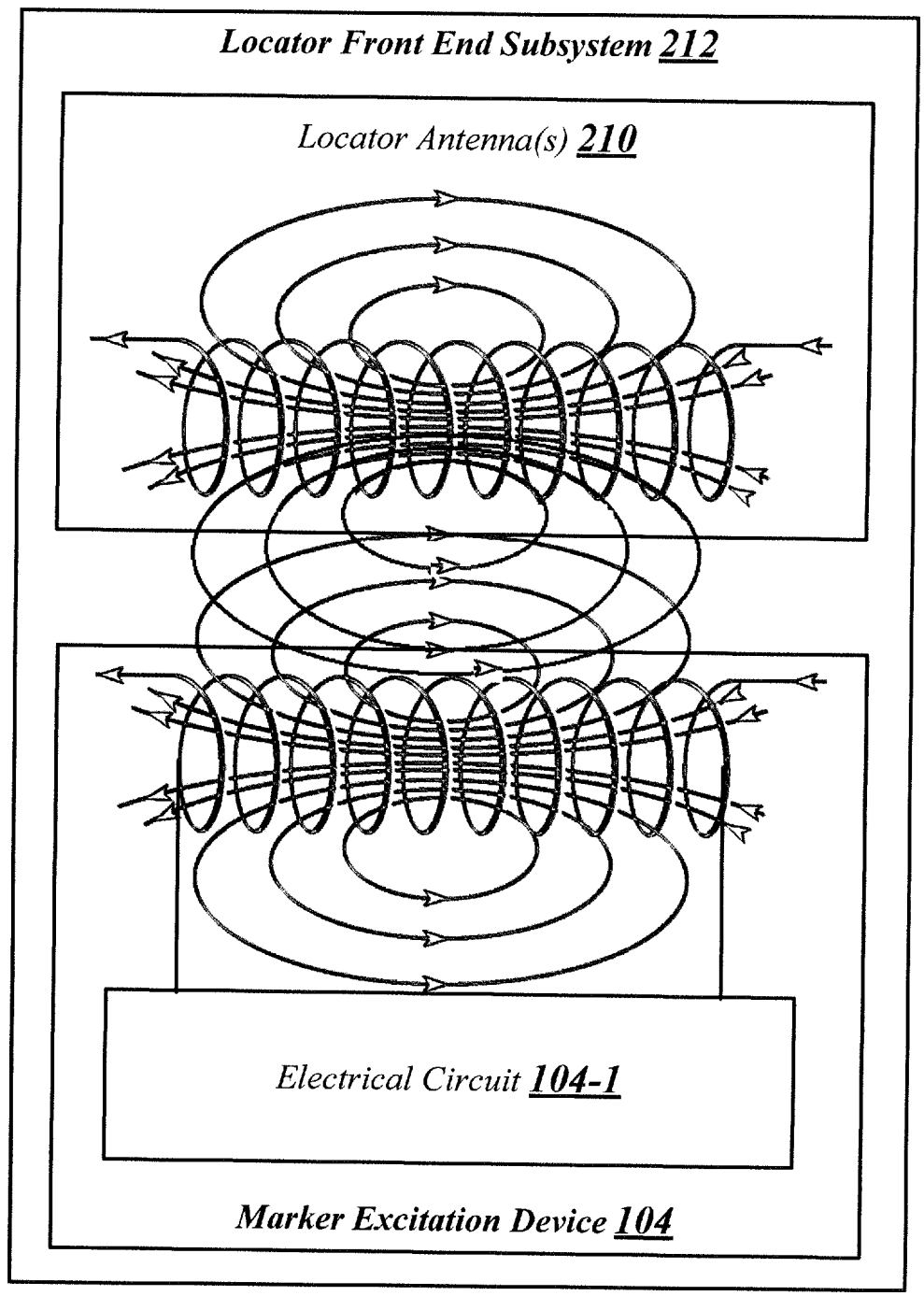

An exemplary block diagram of locator 102 is shown in FIG. 2D. The locator 102 may include a locator front end subsystem 212 which, in one example, may be enclosed in the spherical front end node 206 of the locator 102. Such a locator front end subsystem 212 may include the marker excitation device 104, for example, an integrated marker excitation device 104 that generates a marker excitation signal 114 to be provided to one or more marker devices 106. The locator front end subsystem 212 may also include one or more antennas 210 (typically one or more antenna arrays having antennas, some of which may be in three orthogonal directions and others in a gradient antenna array). The antennas 210 are typically in the form of antenna coils having a wide bandwidth (e.g., from 10 s of Hz to 500 kHz, or greater). Electronic circuit elements, such as amplifiers, buffers, impedance matching circuits, and/or filters etc., may be coupled to antennas 210 to condition and amplify the output of antennas 210. Example antennas and associated locator elements and configurations that may be used in various embodiments are described in the incorporated applications.

Analog and/or digital circuitry 214, including additional analog and/or digital circuit elements such as filters, signal conditioners, analog-to-digital (A/D) converters, multiplexers, and the like, may be coupled to the locator front end subsystem 212 of the locator 102 to condition the output from the locator front end subsystem 212. The output of the analog and/or digital circuitry 214 may then be provided to one or more processing elements 216, which may be coupled to one or more memories 218. Memories 218 may be used to store instructions in a non-transitory format for implementing various functionalities, as described herein, in the processing element(s) 216 by executing instructions on one or more processors or other programmable devices. Memories 218 may also be used for storing information associated with the buried utilities and/or marker devices, for storing location or position information, and/or for storing other data, instructions, or information associated with operation of the locator 102 and associated elements/modules/subsystems of the locator 102.

Various additional modules may be coupled to the processing element(s) 216 and/or memories 218. For example, visual and/or audible outputs 220, such as video displays, lights, speakers, headphones jacks, buzzers, touchscreens, etc., may be coupled to the processing element(s) 216 and the memories 218. I/O interfaces 222, such as mice, trackballs, magnetic user interface devices (UIDs), buttons, touchscreen displays, etc., may be coupled to the processing element(s) 216 to receive user input. One or more location/positioning/navigation modules 224, such as GPS receiver module, GLONASS receiver module, or other satellite or terrestrial navigation receiver modules, one or more inertial navigation or location modules, accelerometer, compass, or other magnetic sensors, etc., one or more optical tracking modules, and the like may be coupled to the processing element(s) 216 and the memories 218. One or more external data communication modules 226 such as wired or wireless interface modules, such as Wi-Fi or Bluetooth transceiver modules, Ethernet or USB interfaces, cellular data interfaces, and/or other wired or wireless communication interfaces may be coupled to the processing element(s) 216 and memories 218. The locator 102 may further include a virtual display module 227 configured to virtually display located buried utilities, and an intelligent battery power supply system 228 having one or more intelligent batteries and associated intelligent battery interface modules which may supply power to the processing element(s) 216, memories 218, analog and/or digital electronic circuitry 214, locator front end subsystem 212, and/or other circuits and/or subsystems of the locator 102.

In a typical embodiment, the marker excitation device 104, which may include the marker excitation device antenna 104-2 (See FIG. 2C), is integrated into the locator front end subsystem 212, which also includes locator antennas 210. This may lead to a magnetic field coupling between the marker excitation device antenna 104-2 and the locator antennas 210, as shown in the FIG. 2E. The magnetic field coupling between these antennas changes the effective mutual inductance and impedance generated thereof, which may alter the characteristics/functioning of both the locator 102 as well as the marker excitation device 104 leading to potential errors in the output of these devices. To mitigate such problems, the locator 102 with integrated marker excitation device 104 may be calibrated using uniform/known fields, such as before first or successive usages. In one embodiment, the calibration may be performed according to a two-stage calibration method, which includes performing a first set of calibrations on the locator 102 by turning the marker excitation device 104 "OFF," and subsequently performing a second set of calibrations by turning the marker excitation device 104 "ON."

Figure 2F:
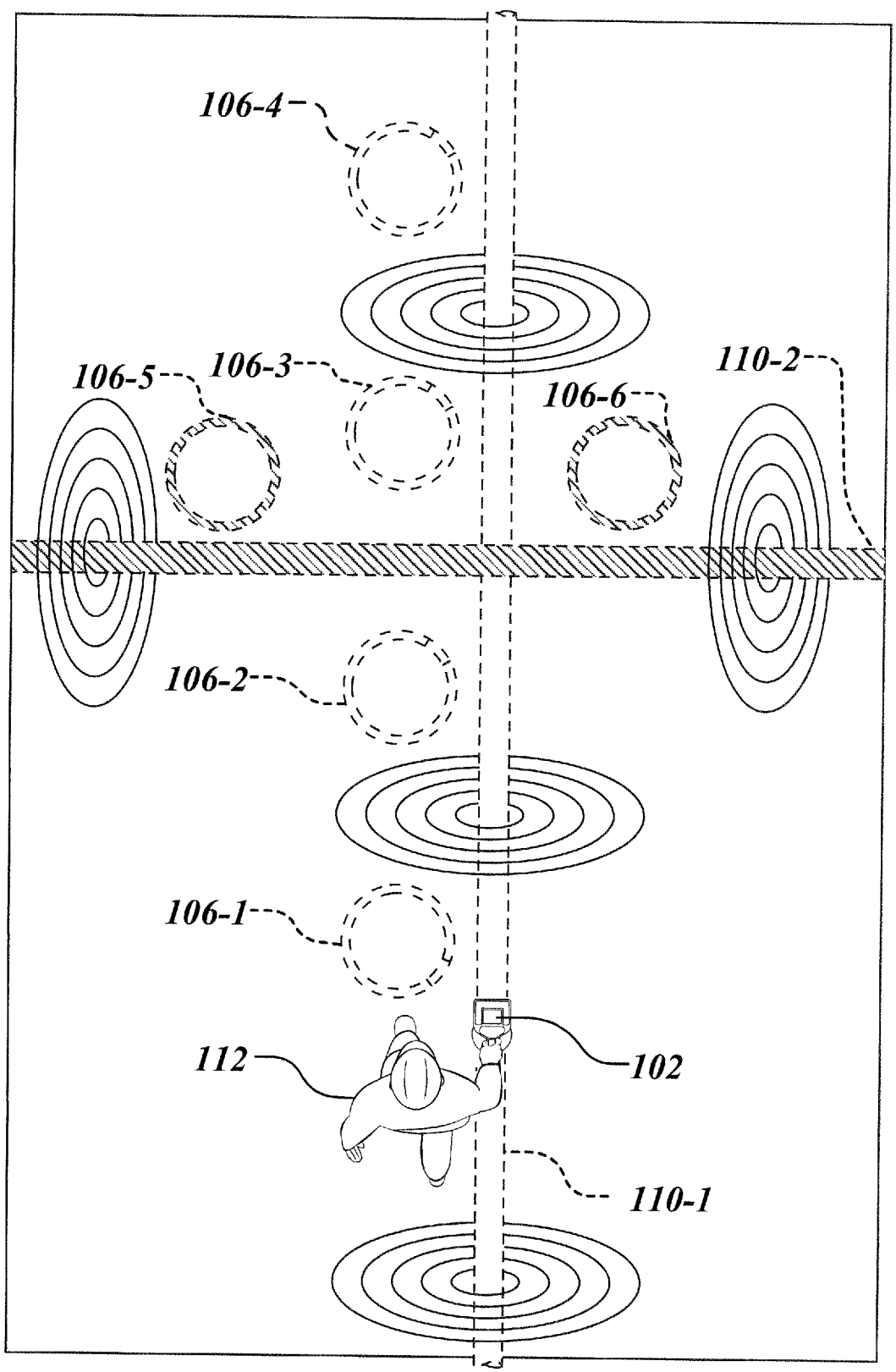
Figure 2G:
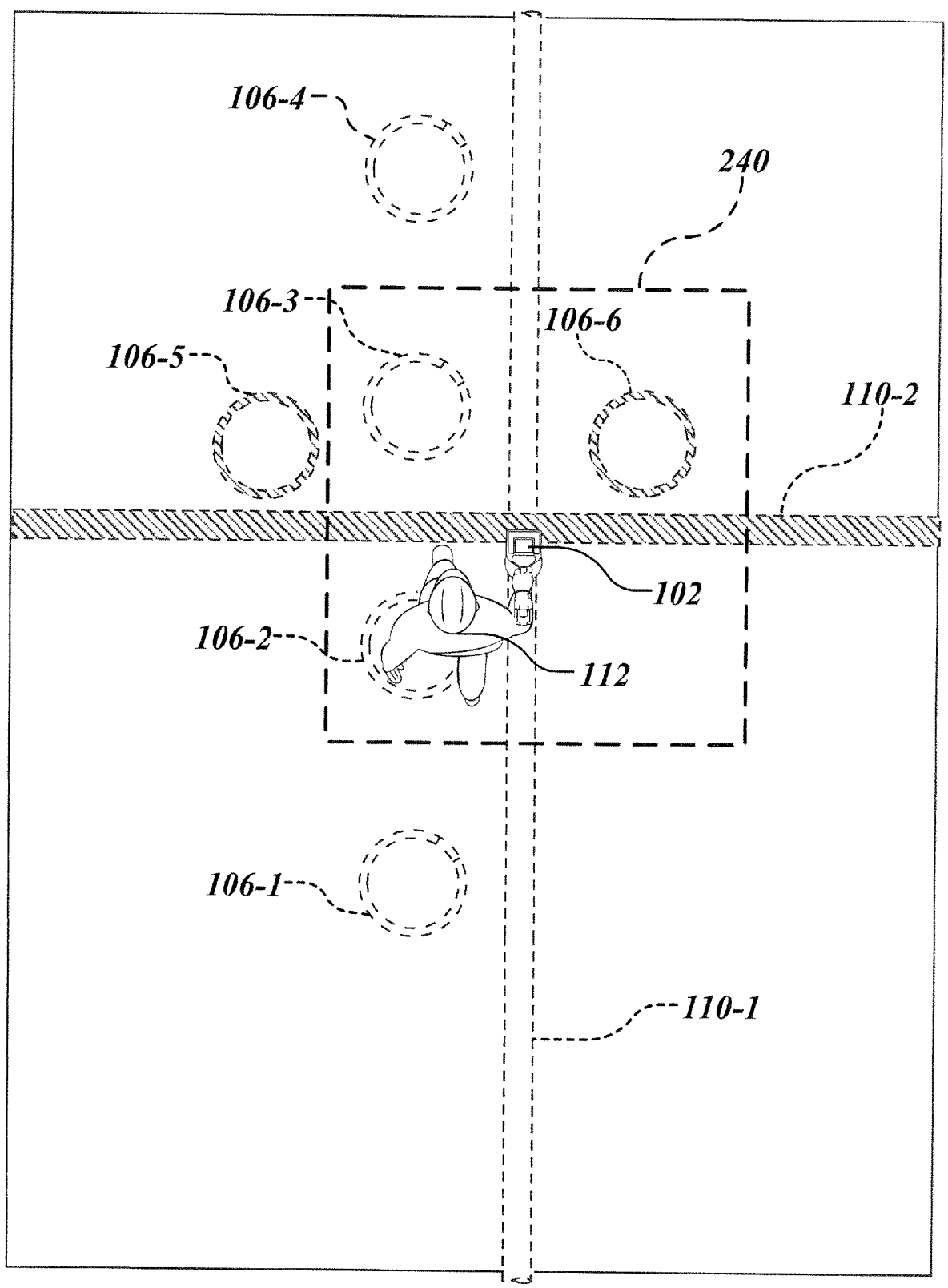

In some embodiments, locator 102 may be configured to simultaneously detect two or more marker devices 106, such as marker devices 106-1, 106-2, 106-3, 106-4, 106-5, and 106-6, buried in proximity of one or more buried utilities 110, such as buried utilities 110-1 and 110-2 (shown in FIG. 2F). This may be useful, for example, when a user 112 moves to a location where there are multiple marker devices, such as marker devices 106-2, 106-3 and 106-6, which are in close proximity of the locator 102 (See FIG. 2G) such that the marker devices are simultaneously responding to the locator 102 and broadcasting information related to their identity, which in this example, are serial codes, for example, one of 8 bits, 16 bits or 32 bits unique serial codes.

The locator 102 may receive such serial codes and may create a geo-fence 240 around such marker devices 106-2, 106-3 and 106-6. The locator 102 may also obtain corresponding digital representations of such serial codes from a remote non-transitory memory, such as the memory 402 described subsequently, where such serial codes and their corresponding digital representations are pre-stored, or from the local memory 218 of the locator 102 where such serial codes, such as serial codes 244, and their corresponding digital representations, such as digital representations 246, are downloaded from the remote non-transitory memory 402 (See FIG. 2H).

Figure 2H:
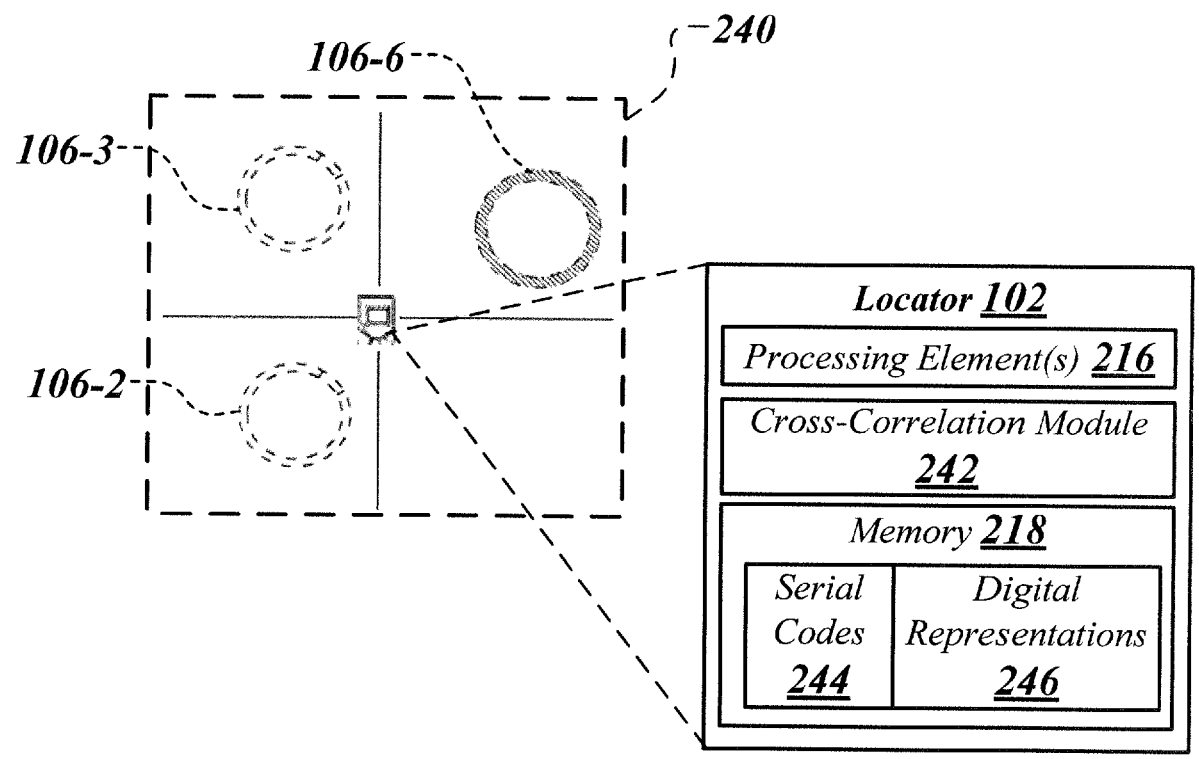

Such serial codes and their corresponding digital representations may then be received by a cross-correlation module 242 provided within the locator 102 (See FIG. 2H). The cross-correlation module may be configured to execute cross-correlation on such serial codes and digital representations using, for example, multiple correlators in parallel, to assign cross-correlation weights, which may thereafter be applied to locator antenna signals one by one to generate an output, which may be subsequently fed into a locating algorithm such as a dipole locating algorithm, resulting in individual identification/detection of each of the marker devices 106-2, 106-3 and 106-6 in the geo-fence 240 substantially simultaneously. In some embodiments, the cross-correlation may be performed in real-time or during post-processing at the locator 102, the remote computing device 122, and/or other computing systems/devices. In other embodiments the cross-correlation may be performed in non-real time.

Various details of the marker device 106 embodiments are described subsequently herein with reference to FIGS. 3A-3C.

Figure 3A:
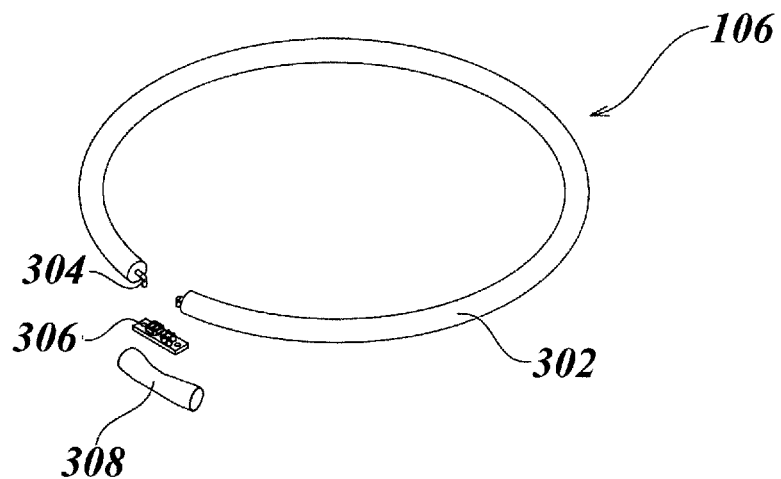
FIGS. 3A-3C illustrate an embodiment of an electronic marker device.
Figure 3B:
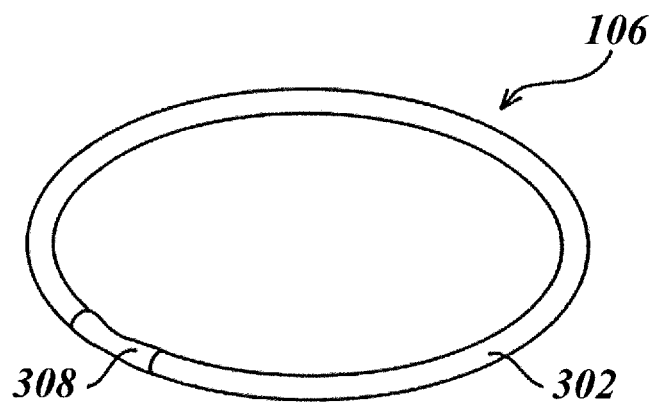

As shown in FIG. 3A, a marker device 106 embodiment may include an insulating jacket 302 encapsulating a conductive antenna 304. The insulating jacket 302 may be comprised of polypropylene or other materials such as polyethylene, polystyrene, polytetrafluoroethylene, and the like, having a dielectric constant substantially similar to that of polypropylene (about 2.2). The antenna 304 may comprise copper-clad steel or other conductive materials. The antenna 304 may be a loop antenna comprising a single individually insulated antenna coil. In such embodiments, the mechanical strength of the steel in the copper-clad steel antenna may aid in maintaining the desired shape of antenna and overall marker device while minimizing impedance at high operating frequencies due to skin effect. In application in the field, the marker device 106 may be placed in the ground surface with a central axis of the loop antenna 304 substantially tangential to the ground surface.

The marker device may include an electrical circuit 306 containing transceiver circuitry, which may connect electrically about either end of the coil of antenna 304. A cover piece 308, as shown in FIG. 3A and FIG. 3B, may surround and cover the electrical circuit 306 providing protection to electrical circuit 306 from the external environment. As illustrated, in an exemplary embodiment, the marker device 106 may be toroidal in shape maximizing effective antenna area given a particular length of antenna 304.

The diameter of the marker device 106 and the antenna 304 embodiments described herein may be dimensioned to provide the range needed to receive signals from the locator or other excitation device(s) and transmit signals measurable at the locator 102. For example, in underground marking applications a marker device, such as marker device 106, may have an antenna loop of 20 to 30 cm in diameter. In alternative embodiments, loop antennas 304 may be formed into shapes other than a toroid. The dimensions of such non-toroidal shaped marker device antennas may be adjusted to provide appropriate aperture and range in signal required.

Figure 3C:
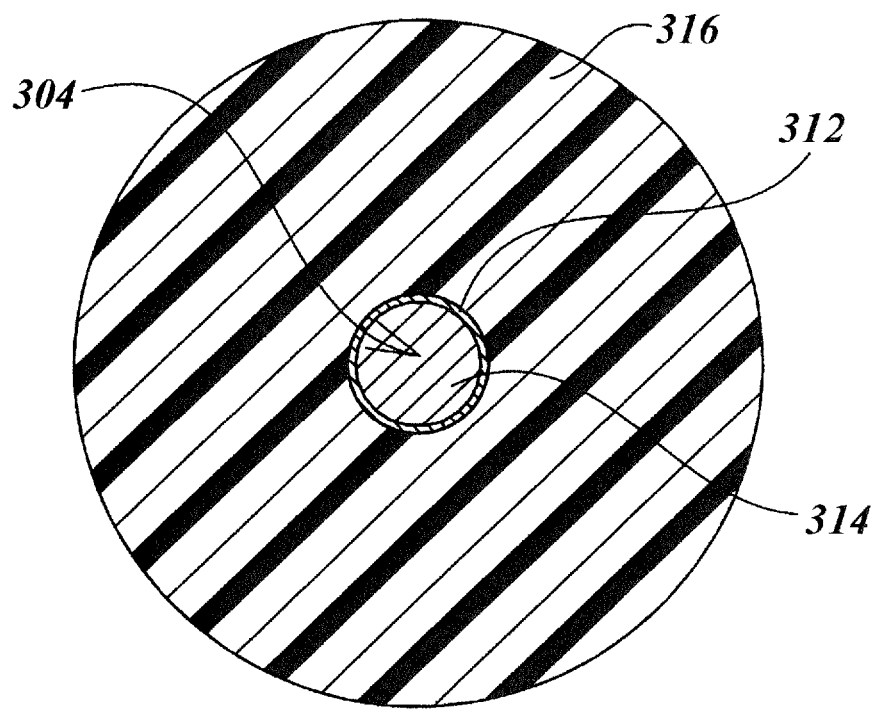

Turning to FIG. 3C, an antenna which may be comprised of copper-clad steel may have an outer conductor 312 surrounding a steel interior 314. The insulating jacket encapsulating antenna 304 may be of a selected thickness, given the dielectric constant of jacket materials, to reduce capacitive coupling of signals to conductive soil or other surrounding environment and further detuning of the marker device 106. Insulating jacket 302 and cover piece 308 (FIG. 3B) may further protect against corrosive or other damaging elements of the soil or other environment in which marker device 106 may be placed.

In some embodiments, the dielectric material jacketing the antenna 304 may be at least half the diameter of the antenna conductor. Within marker device 106, the insulating jacket 302 may be of ⅜ to ½ inch polypropylene encapsulating an antenna 304 of 10 to 12 gauge copper-clad steel. The transceiver circuitry, when coupled with an antenna 304, such as the loop antenna or other antenna types, may be configured for receiving marker excitation signals, processing and powering the marker device from received marker excitation signals, and generating corresponding marker response signals. Various aspects of the marker device and an exemplary transceiver circuitry has been described in the incorporated applications including U.S. patent application Ser. No. 14/516,558, filed Oct. 16, 2014, entitled ELECTRONIC MARKER DEVICES AND SYSTEMS; and U.S. Patent Application 62/295,502, filed Feb. 16, 2016, entitled BURIED UTILITY MARKER DEVICES, SYSTEMS, AND METHODS, the contents of which are incorporated by reference herein in their entirety.

Figure 4:
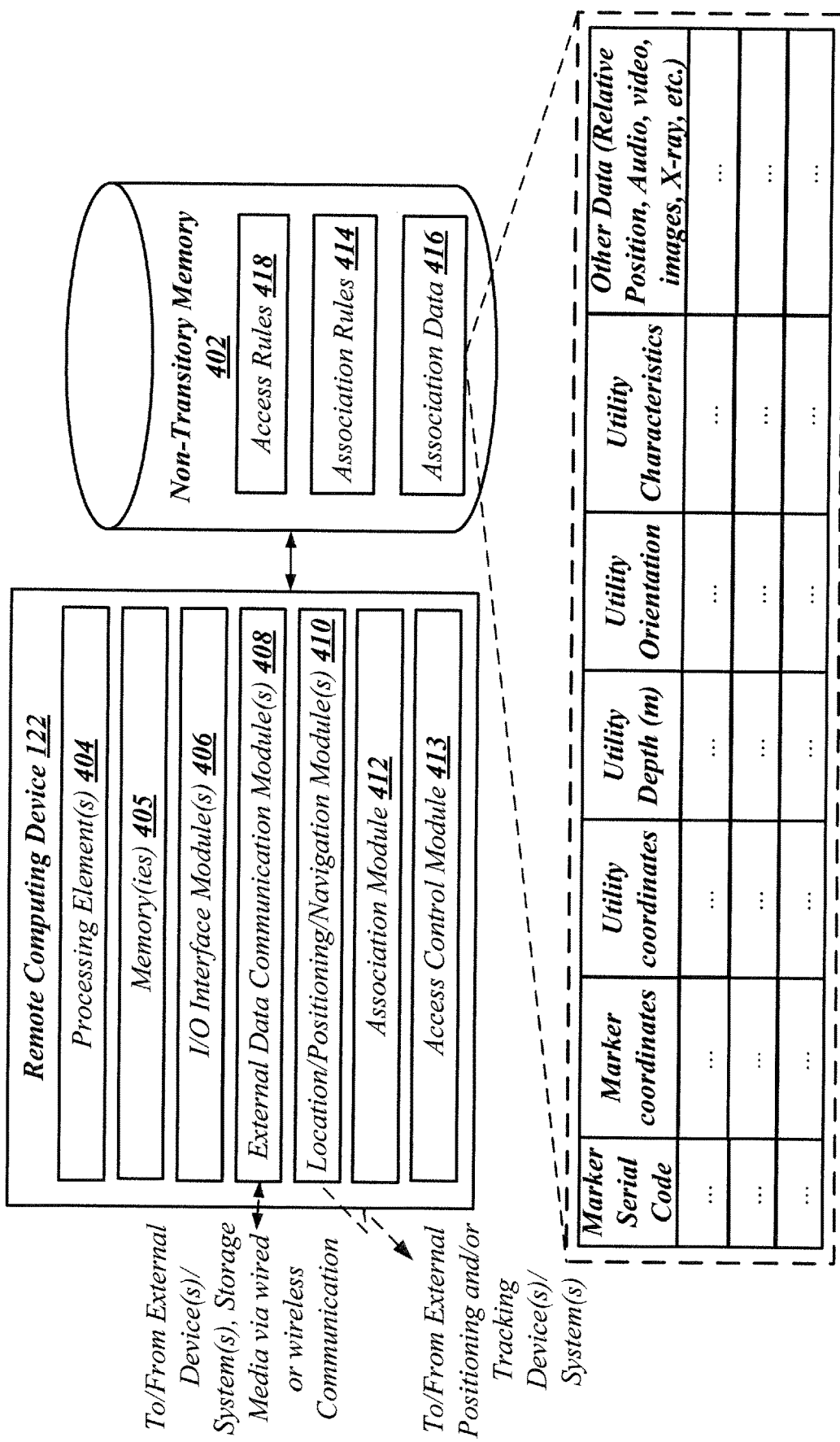
FIG. 4 illustrates an embodiment of a remote computing device and associated non-transitory memory.

FIG. 4 illustrates details of a remote computing device 122 in accordance with an embodiment of the present disclosure. As shown, the remote computing device 122, which may be communicatively coupled to the locator 102 via a suitable wireless or wired communication channel, includes a non-transitory memory 402, which may either be an internal repository implemented within the remote computing device 122, or an external repository associated with the remote computing device 122, configured to centrally maintain data associated with the marker device(s) 106 and the buried utility 110. Such a remote non-transitory memory 402 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The remote computing device 122 may be a computer, a server, a cluster of computers or servers, cloud computing, server farm, server farms in different locations, or other electronic or optical computing devices or systems. The remote computing device 122 may include multiple and separate components that may be electrically, optically, and/or wirelessly connected or interfaced with one another. The remote computing device 122 may be accessible to one or more user devices (not shown), such as smart phone, personal digital assistant (PDA), wireless laptop, a notebook computer, a navigational device (e.g., a global positioning system (GPS) device), or any portable device capable of displaying, processing, and/or manipulating data and/or graphical information, via a suitable communication channel (e.g., wired or wireless).

The remote computing device 122 includes one or more processing element(s) 404 and one or more memories 405 coupled to the processing element(s) 404. The processing element(s) 404 refer to devices or apparatus to carry out programmable instructions or steps and/or other functions associated with the methods described herein by processing instructions, typically in the form of coded or interpreted software instructions. For example, the processing element(s) 404 may include a single processor, or multiple processors, all of which could include multiple computing units. The processor(s) may be implemented as one or more microprocessors, microcomputers, microcontrollers, digital signal processors, central processing units, state machines, logic circuitries, field-programmable gate arrays (FGPA), and/or any devices that manipulate signals based on operational instructions. Among other capabilities, the processor(s) may be configured to fetch and execute computer-readable instructions and data stored in the memories 405.

The remote computing device 122 may further include various modules coupled to the processing element(s) 404. Such modules may include I/O interface module(s) 406, external data communication module(s) 408, location/position navigation module(s) 410, an association module 412, an access control module 413, and other modules (not shown). The I/O interface module(s) 406 may include display, control and/or user interface components, such as one or more visual displays, speakers and/or headphone interfaces, switches, touchscreen elements, one or more camera elements, and the like, enabling a user/locator to communicate with the electronic computing system. The external data communication module(s) 408 may include wired or wireless interface modules, such as Wi-Fi or Bluetooth transceiver modules, Ethernet or USB interfaces, cellular data interfaces, and/or other wired or wireless communication interfaces to facilitate communication between the remote computing device and other external devices/systems. The location/position navigation module(s) 410 may include a GPS module or other satellite or terrestrial navigation/positioning modules.

The association module 412 coupled to the processing element(s) 404 and the memory 405 may be configured to obtain marker device data and utility data from the locator 102 and generate an association between the marker device data and the utility data. The association may, for example, be based on predefined association rules 414. The resulting association data 416 may be stored in the remote non-transitory memory 402. For example, association data 416 may be stored in the form of an association table (e.g., database table) which associates the marker device data such as marker serial code (or other marker identifier), positional coordinates, etc., with the utility data such as absolute positioning data (e.g., utility coordinates), depth, orientation (e.g., in 2D/3D), phase (Ø), characteristic (e.g., type, size, material, etc., of utility, current/impedance, voltage, and other electrical parameters in the utility), elevation, elevation angle (α), images, X-ray images, videos, audio notes, etc., corresponding to/associated with the marker device data, as shown in the FIG. 4.

A marker device may be associated with more than one utility. In this case, the association table may have multiple rows of utility records (one pertaining to each utility) corresponding to the same marker device. The association data 416 may also include other marker device data such as depth and/or orientation of the marker device relative to the ground surface, elevation, characteristics of the marker device, and/or other information associated with the marker device, and other utility data such as relative positioning data indicative of position (e.g., left offset, right offset) including orientation and/or depth of the buried utility relative to the marker device, landmarks/other utilities in proximity to the buried utility, and the like.

Such relative positioning data may be evaluated by the association module 412, other modules coupled to the processing elements 404, and/or other associated devices/systems based on corresponding absolute positions of the utility and the marker device(s). In some cases (e.g., where absolute positions are unknown), the relative positioning data may be evaluated, by the association module 412 in conjunction with various image capturing and image analysis device(s)/module(s) (not shown), and other modules/devices/systems, based on obtaining real-time image(s) of the position of the locator relative to work area/field and virtually positioning the energized marker device(s) on the obtained image(s) to determine relative position of the utility with respect to the marker device(s). Such relative positioning data may be used in conjunction with the absolute positioning data to assist in precisely locating the buried utility during subsequent locate operations. Further, in cases (e.g., non-GPS/GNSS zones) where the absolute positioning data may not be obtained, the relative positioning data may be used to locate the buried utility.

Although the description above and hereinafter primarily refers to the association data 416 being stored in the form of an association table, such form of storage should not be construed in a limiting sense. The association data 416, in various other aspects of the present disclosure, may be stored according to several other forms of associating data, such as ontologies, hierarchical-relationships, relational tables, association matrix, entity relationship models and the like.

The stored association data 416 may be retrieved from the non-transitory memory 402, for example, during future locate operations or for other purposes. For example, when information such as location/position of the buried utility 110 is desirable or is required, such information may be obtained by energizing the marker device 106 and receiving reply data. This may be done by sending marker excitation signals 114, and retrieving information about the utility 110 buried in proximity to the energized marker device 106 from the non-transitory memory 402 based upon the association of the marker device data with the utility data.

In some embodiments, the access control module 413 may be configured to control access to the stored data in the non-transitory memory 402 for individual users, groups, and/or entities based on predefined access rules 418. The access rules 418 may be defined/modified based on various parameters including, but not limited to, type of user, class of the user, user group, entity to which the user is associated, subscription/registration, etc. Such access rules may be executed by the access control module 413 to determine whether a user requesting the stored data or a portion of such data has an authorized access to the requested data or not.

In case of unauthorized access, user's access to the stored data is refused and may optionally be forwarded to an administrator of the non-transitory memory 402. In case of authorized access, the requested data such as information about the utility 110 may be provided to the locator 102 to virtually display the utility 110 on a display unit of the locator 102 or a user device associated with the locator 102, such as a tablet, smart phone, notebook computer, or other display-enabled devices, to guide the user in locating the utility 110 and/or marker device 106.

In one example, the display unit may show an absolute position of the utility 110 (e.g., on a virtual navigational map) which is updated in real-time based on corresponding movements of the locator 102. In another example, the display unit may show relative position of the utility 110 (e.g., on a magnetic compass whose needle may indicate the position of the utility 110). In another example, separate display units may show an absolute position and the relative position of the utility 110 substantially simultaneously. In another example, the display may show position of the utility 110 which is determined based on both the absolute position as well as relative position of the utility 110.

Figure 5:
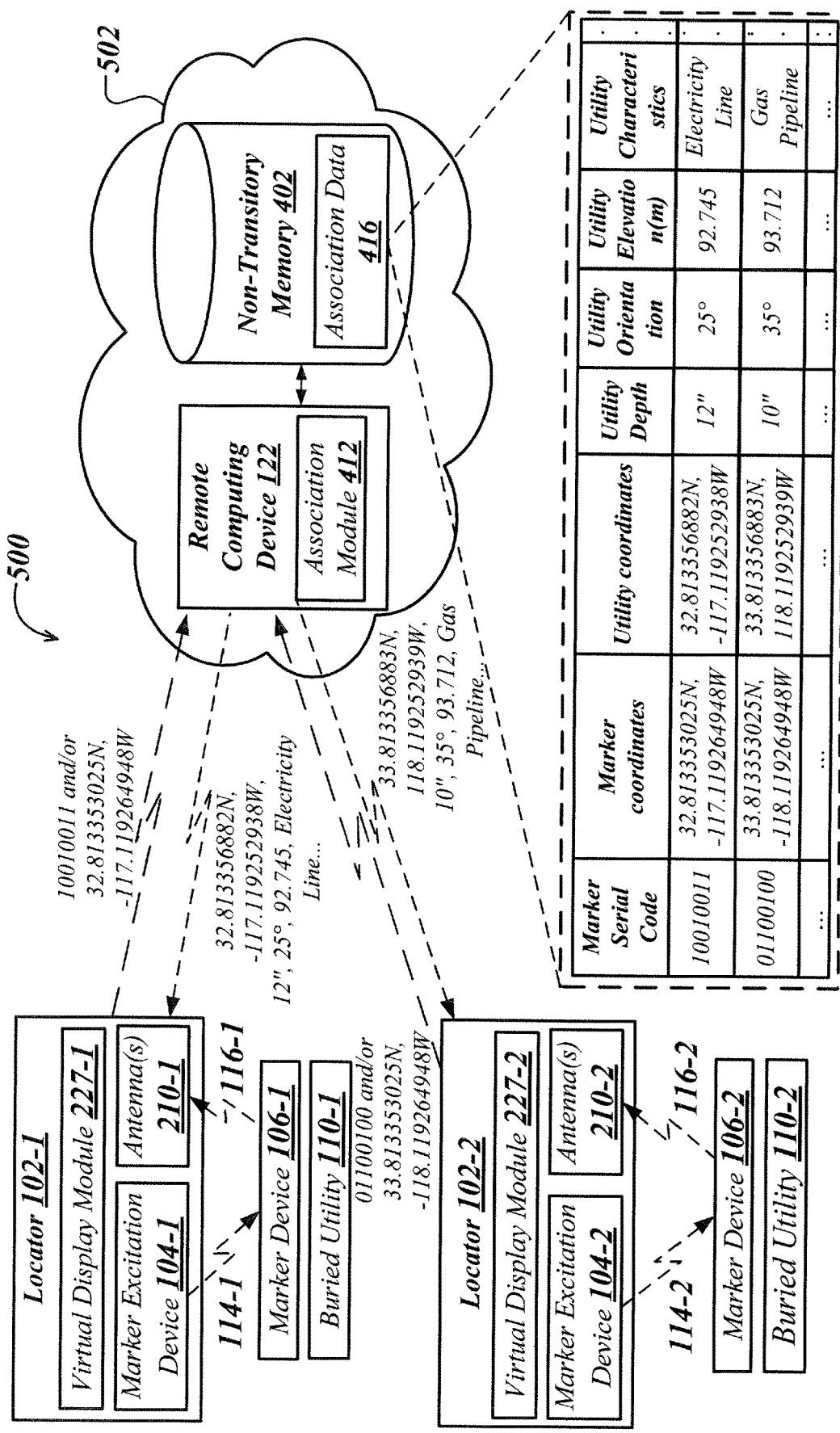
FIG. 5 illustrates an embodiment of a system for electronically marking, locating and virtually displaying buried utilities.

FIG. 5 illustrates details of a system 500 for electronically marking and locating buried utilities, in accordance with another embodiment of the present disclosure. System 500 may include the remote computing device 122, which may be implemented in a cloud computing environment 502 whereby the remote computing device 122 corresponds to a cloud server having coupled thereto the non-transitory memory 402 which corresponds to a cloud database.

Such a remote computing device 122 may be communicatively coupled to one or more locators 102, such as locator 102-1 and locator 102-2, as shown in this example. Locators 102-1 and 102-2 may be utilized by operators to find buried utilities 110-1 and 110-2. For example, to determine the location of the buried utility 110-1, the locator 102-1 may generate and send marker excitation signals 114-1 to excite the marker device 106-1 which may be buried in proximity of the buried utility 110-1. Upon excitation, the marker device 106-1 may generate and send a marker response signal 116-1, which may be received by antenna(s) 210-1 within the locator 102-1 and may be subsequently processed by the locator 102-1 to determine marker device data (e.g., position and/or identity of the marker device).

Based on the marker device data (e.g., marker device identifier "10010011" and/or positional coordinates of the marker device relative to the ground "Latitude: 32.813353025N, Longitude: −117.119264948 W," etc., as shown in FIG. 5), the locator 102-1 may query the remote computing device 122 to determine location information pertaining to the utility 110-1 buried in proximity of the marker device 106-1. Upon receiving the marker device data, the remote computing device may execute the association module 412 to retrieve utility data (e.g., positional coordinates of the buried utility relative to the ground "Latitude: 32.813356882N, Longitude: −117.119252938 W," depth of the buried utility relative to the ground '12",' orientation of the buried utility relative to the ground "25°", elevation of the buried utility "92.745m" and/or characteristics of the buried utility "Electricity Line," etc., as shown in FIG. 5) from the association data 416 stored in the non-transitory memory 402.

Likewise, to determine the location of the buried utility 110-2, locator 102-2 may generate and send marker excitation signals 114-2 to excite the marker device 106-2, which may be buried in proximity of the buried utility 110-2. Upon excitation, the marker device 106-2 may send a marker response signal 116-2, which may be received by antenna(s) 210-2 within locator 102-2. The signal may then be subsequently processed by the locator 102-2 to determine marker device data (e.g., marker device identifier "01100100" and/or positional coordinates of the marker device relative to the ground "Latitude: 33.813353025N, Longitude: −118.119264948 W," etc., as shown in FIG. 5). Based on the marker device data, the locator 102-2 may query the remote computing device 122 to determine location information pertaining to the utility 110-2 (buried in proximity to the marker device 106-2). Upon receiving the marker device data, the remote computing device 122 may execute the association module 412 to retrieve utility data (e.g., positional coordinates of the buried utility relative to the ground "Latitude: 33.813356883N, Longitude: −118.119252939 W," depth of the buried utility relative to the ground "10"," orientation of the buried utility relative to the ground "35°," elevation of the buried utility "93.712" and/or characteristics of the buried utility "Gas Pipeline," etc., as shown in FIG. 5) from the association data 416 stored in the non-transitory memory 402.

Figure 6A:
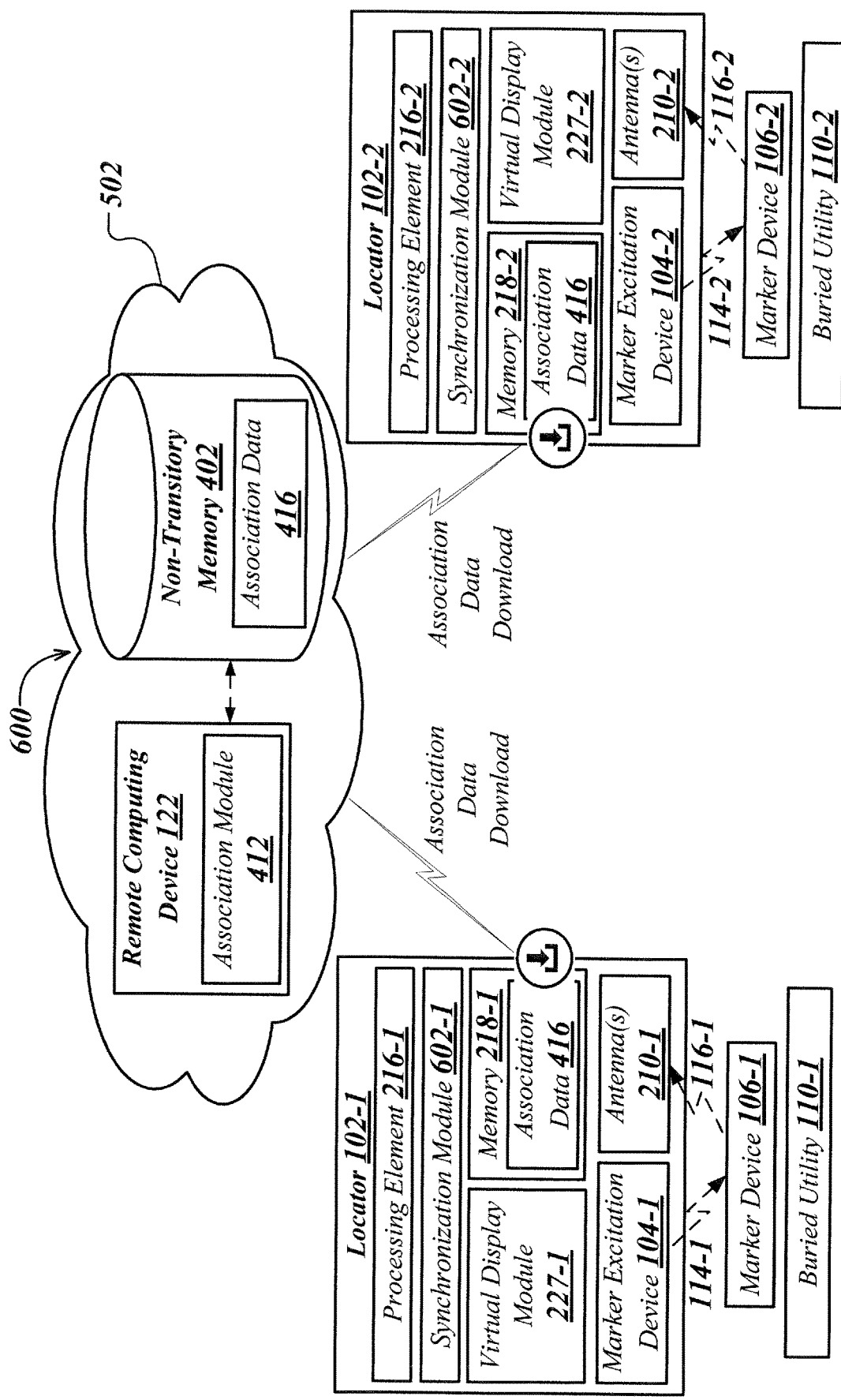
FIGS. 6A-6B illustrate details of another embodiment of a system for electronically marking and locating buried utilities.

FIG. 6A illustrates details of a system 600 for electronically marking and locating buried utilities. The system 600 may include remote computing 122 having a non-transitory memory 402 coupled thereto, which may contains the association data 416 (i.e., associated marker device data and the utility data) stored therein, and one or more locators 102, such as locator 102-1 and the locator 102-2 communicatively coupled to the remote computing device 122 (as described previously).

In this embodiment, prior to locate operations or at other times, a portion of or entire association data 416 stored in the non-transitory memory 402 may be downloaded/pre-loaded (entirely or in part) into local memories 218-1 and 218-2 of locators 102-1 and 102-2, respectively (as shown in the FIG. 6A). Locators 102-1 and 102-2 may include respective synchronization modules 602-1 and 602-2 (other than the modules and components described in the appended drawings figures, and those described in the incorporated applications), which may be configured to synchronize the association data 416 stored in the local memories 218-1 and 218-2 of corresponding locators 102-1 and 102-2, with the association data 416 stored in the non-transitory memory 402 to maintain data consistency. The synchronization may be performed periodically at regular or predefined intervals/timings, based on occurrence of various predefined or system events, and/or when new data becomes available in the remote database 402. Locators 102-1 and 102-2 also include virtual display modules, such as the virtual display modules 227-1 and 227-2 to virtually display the buried utilities and associated audio/visual data on display units of the locators 102-1 and 102-2, respectively, or display units of user devices.

In operation, when location and other details associated with a buried utility, say buried utility 110-1, are desired or required to be determined (e.g., during locate operations), a locator, say, locator 102-1, equipped with a marker excitation device 104-1 may be utilized to energize a marker device 106-1 placed below the ground surface in proximity to the buried utility 110-1 to obtain marker device data (e.g., marker identifier or serial code) pertaining to the energized marker device 106-1. Based on the marker device data, the locator 102-1 may determine if the local memory 218-1 of the locator 102-1 contains utility data (e.g., position of buried utility 110-1, characteristics of the buried utility 110-1, etc.) associated with the energized marker device 106-1. In case utility data exists in the local memory 218-1, the virtual display module 227-1 of the locator 102-1 may be configured to display real-time position of the buried utility 110-1 on a display unit of the locator 102-1 or a user device (e.g., smartphone, tablet, PDA, etc.) coupled to the locator 102-1. Otherwise, the locator 102-1 may be configured to retrieve the utility data corresponding to the energized marker device 106-1 from the non-transitory memory 402, which may thereafter be displayed to the user by the virtual display module 227-1.

Figure 6B:
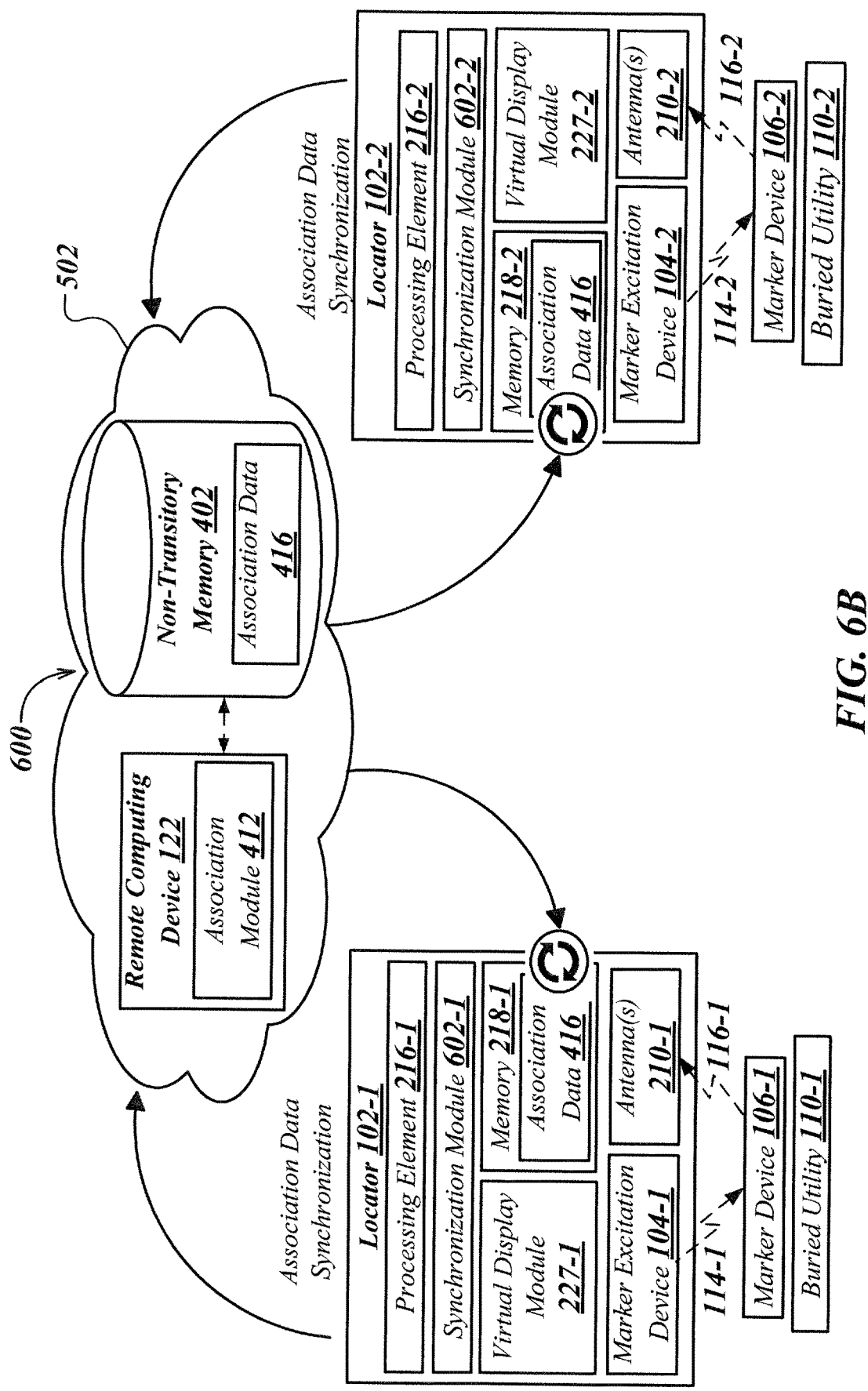

Locator 102-1 may be configured to store the retrieved data in its local memory 218-1. Locator 102-1 may be subsequently configured to trigger the synchronization module, such as the synchronization module 602-1, to sync the association data with non-transitory memory 402 (as shown in the FIG. 6B). In some embodiments, virtual display modules 227-1 and 227-2 may be configured to virtually display the buried utilities 110-1 and 110-2, respectively, on a display unit of the locator 102 and/or the user device 510

Figure 6C:
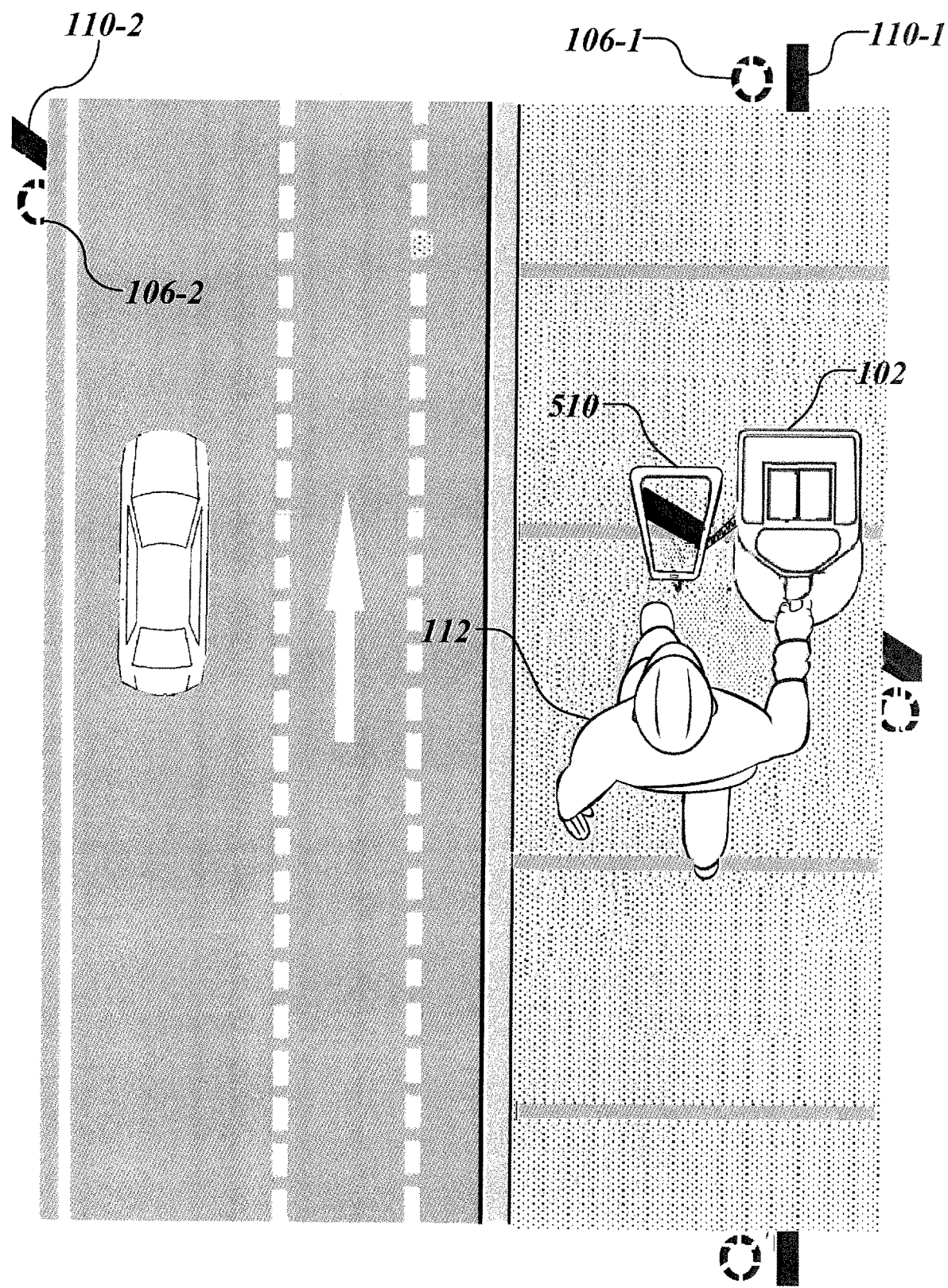
FIG. 6C illustrates an embodiment of a display unit of the locator and/or user device virtually displaying one or more buried utilities thereon.

(See FIG. 6C). Additionally, other data (e.g., pre-stored images, audios, videos, and textual information) associated with the buried utilities 110-1 and 110-2 may also be displayed or overlaid on the display unit and/or communicated to a user 112 using audio/sound devices (not shown). Position of the buried utilities 110-1 and 110-2 on the display unit, and other associated data such as pre-stored images, videos, and/or textual information, may be updated in real-time by virtual display modules 227-1 and 227-2 based on corresponding movements of the buried utility locator above the ground surface.

Figure 6F:
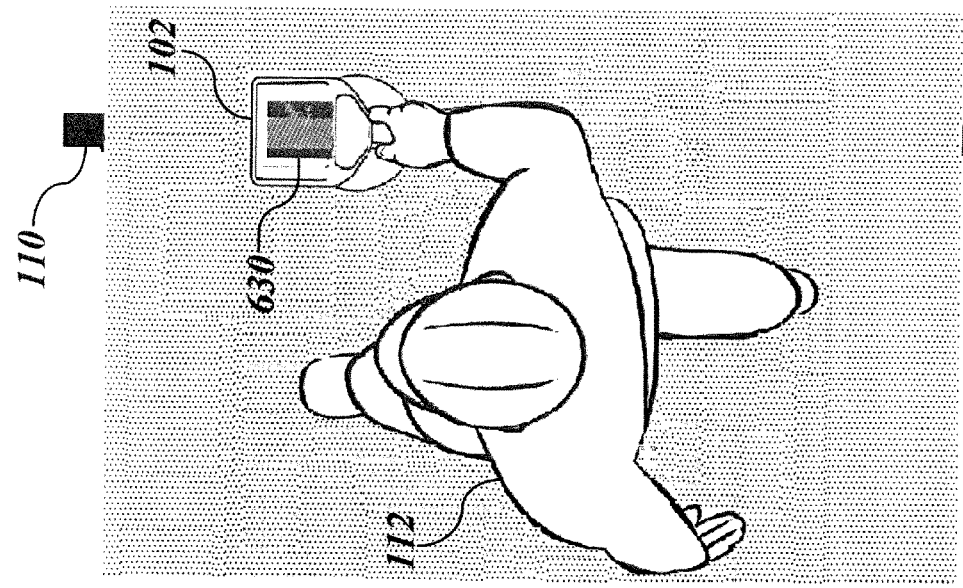
FIGS. 6D-6F illustrate an embodiment of a display unit of the locator and/or user device virtually displaying a welded buried utility with an X-ray image of the weld site.
Figure 6E:
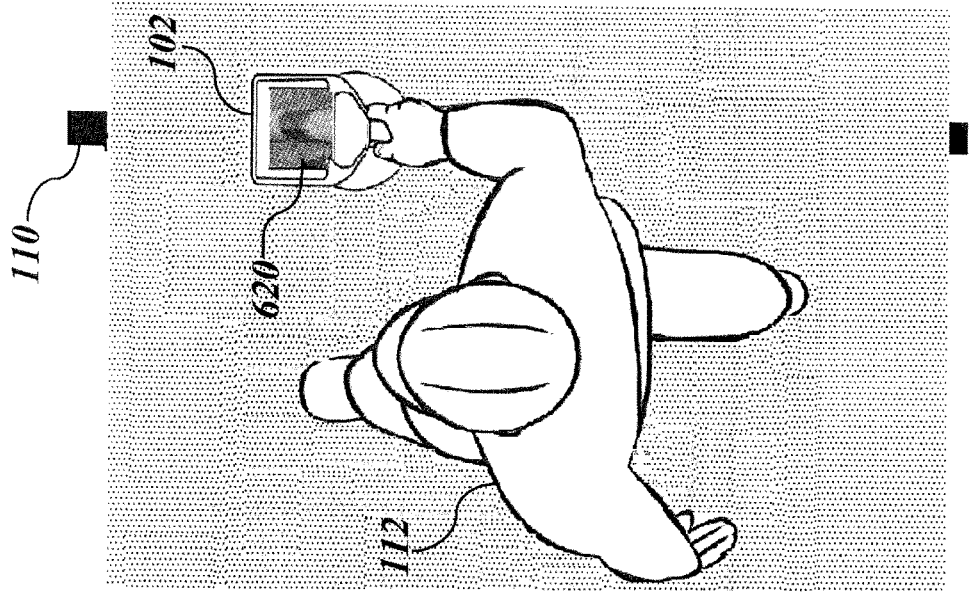
Figure 6D:
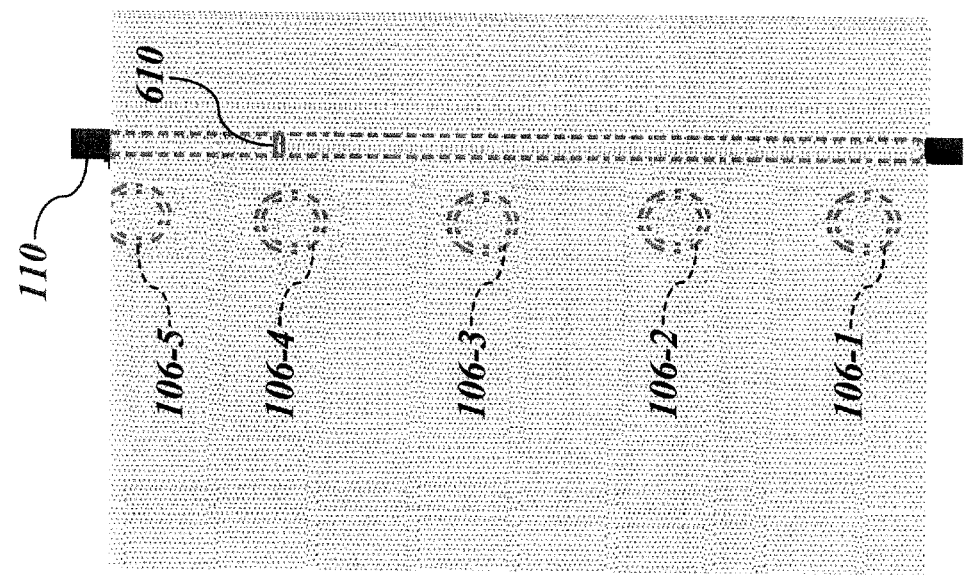

In an example illustrated in the FIGS. 6D-6F, a plurality of marker devices 106-1, 106-2, 106-3, 106-4, and 106-5, may be buried in proximity to a welded buried utility 110, which in this example, is a gas pipeline comprising pipe sections welded at a site 610. As described previously, the marker devices buried in proximity to the utility may be energized to locate and virtually display the utility on a display unit of the locator and/or user device. According to this example, in addition to the virtual display, placement of the marker device(s) in proximity to one or more weld sites or other leakage/fault prone sites on the utility 110 may be used for obtaining more information related to the weld sites upon detection of leakages/faults in the utility 110. For example, the marker device 106-4 which is placed in proximity to the weld site 610 (See FIG. 6D), may be energized by the locator 102 equipped with the marker excitation device, to retrieve utility data, such as position of the utility 110 and/or photo image(s) 620, of the utility 110, and in particular, the weld site 610, from the remote non-transitory memory and/or local memory of the locator 102, which may be displayed on the display unit of the locator 102 (See FIG. 6E) and/or the user device (not shown) coupled to the locator 102.

Upon virtual detection of the weld site 610 on the display, retrieval of a corresponding X-ray image (e.g., a real time X-ray image) of the weld site 610 from the remote non-transitory memory/local memory of the locator 102 may be triggered either automatically or based on user's input. The retrieved X-ray image may thereafter be displayed on the display unit of the locator 102 (See FIG. 6F) and/or display unit of the user device (not shown) allowing accurate determination of the weld site 610 and its position for excavation, repair, and/or other purposes.

Figure 7:
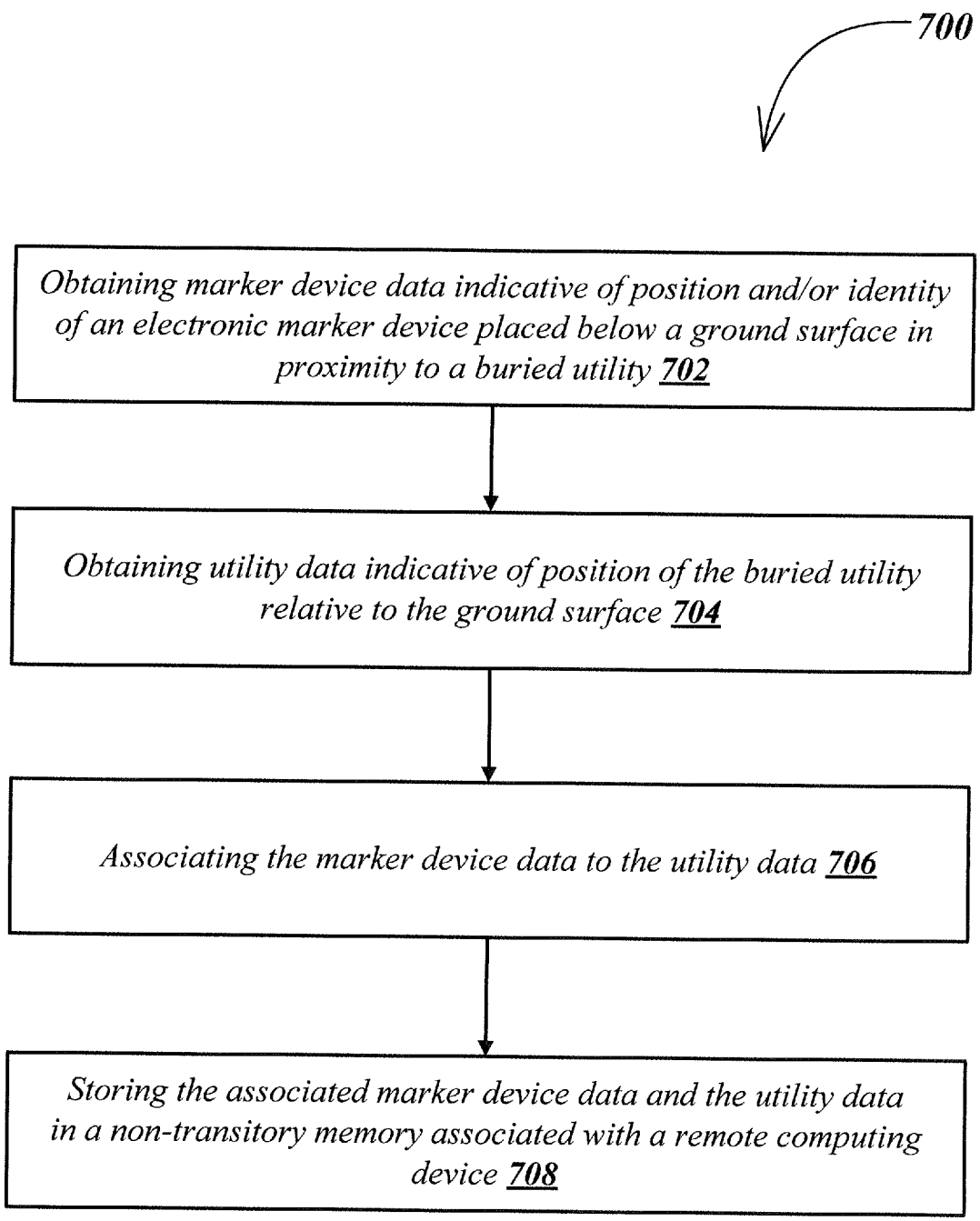
FIG. 7 illustrates an embodiment of a method for electronically marking buried utilities.

FIG. 7 illustrates details of an embodiment of a method 700 for electronically marking buried utilities.

In some embodiments, the method 700 may be implemented in a computing device, such as the remote computing device 122 or other computing device(s). Further, the method 700 may be described in the general context of computer executable instructions, which may include routines, programs, objects, components, data structures, procedures, modules, functions, etc., that perform particular functions or implement particular data types. The method may also be practiced in distributed computing environments that are linked through a communications network. Further, the order in which the method 700 is described is not intended to be construed as a limitation, and any number of the described method blocks can be combined in any order to implement the method 700, or alternative methods. Additionally, individual blocks may be deleted from the method 700 without departing from the spirit and scope of the subject matter described herein.

As shown in FIG. 7, the method 700 may be initiated at block 702, where the method may include obtaining marker device data indicative of position and identity of an electronic marker device placed below a ground surface in proximity to a buried utility. The marker device data may include information pertaining to identity (e.g., unique marker device identifier (ID) or a serial number of the marker device, or any other information capable of distinguishing the marker device from other marker devices). The remote computing 122 may obtain such marker device data from the locator 102. For example, the locator 102 may generate and send a marker excitation signal 114 to the marker device 106 to energize the marker device 106. Upon energizing, the marker device 106 may generate and send a marker response signal 116 responsive to the marker excitation signal 114. Such marker response signal 116 may be received by one or more antennas 210 within the locator 102 and is thereafter processed by one or more processing elements within the locator 102 to determine the marker device data, which may be transmitted to the remote computing device 122.

At block 704, the method may include obtaining utility data indicative of position of the buried utility relative to the ground surface. Such utility data may include, for example, position including positional coordinates, depth and orientation of the buried utility relative to the ground surface. The utility data may also include characteristics of the buried utility, such as type of the utility, other utilities present in proximity to the buried utilities, images, videos, audio notes, etc., and/or other data associated with the utility and/or its environment or other associated information. The remote computing device 122 may obtain such utility data from the locator 102.

For example, the locator 102, in addition to detecting signals from the marker device, may also detect signals emitted from the buried utility. The one or more antennas 210 of the locator 102 may sense magnetic field signals 118 emitted from the buried utility. The sensed signals may then be processed by one or more processing elements of the locator 102 to determine the utility data, which may be transmitted to the remote computing device 122. The locator 102 may simultaneously sense the signals (e.g., marker response signal 116) from the marker device and the signals (e.g., magnetic field signals 118) from the buried utility 110, and substantially simultaneously process the signals to determine both the marker device data and the utility data, which may then be transmitted to the remote computing device 122.

At block 706, the method may include associating the marker device data to the utility data. For example, an association module 412 of the remote computing device 122 may generate an association between the marker device data and the utility data and produce association data which associates the marker device data (such as data pertaining to identity of the marker device (e.g., marker device ID and/or serial code) and/or position of the marker device relative to the ground including depth, and/or orientation, etc.) with the utility data, such as position of the buried utility relative to the ground including depth and/or orientation, etc. The association data may also include other marker device related data such as elevation of the marker device, characteristics of the marker device such as type of marker device (e.g., loop marker device), and the like. The association data may include other utility data such as reference data indicative of position of the buried utility relative to the marker device, elevation of the buried utility, elevation angle, landmarks/other utilities in proximity to the buried utility, and the like.

At block 708, the method may include storing the associated marker device data and the utility data in a non-transitory memory 402 associated with a remote computing device 122, such that the utility data may be retrievable from the non-transitory memory based in part on the marking device data. The remote computing device 122 may store the association data 416, (i.e., the associated marker device data and the utility data) in a non-transitory memory 402 associated with the remote computing device 122. Storage of the association data 416 may be in the form of an association table or other forms, such as ontologies, hierarchical-relationships, relational tables, association matrix, entity relationship models and the like. The stored data may be retrieved when required. For example, during future locate operations or for other purposes, when information such as location/position of the buried utility 110 is desirable or required, such information may be retrieved from the non-transitory memory based in part on the marker device data (e.g., marker device ID and/or position of the marker device), which may be obtained by the locator upon energizing the corresponding marker device. A copy of the data (e.g., entire data or a portion of data) may also be pre-loaded into a local memory of the locator and retrieved therefrom.

Figure 8:
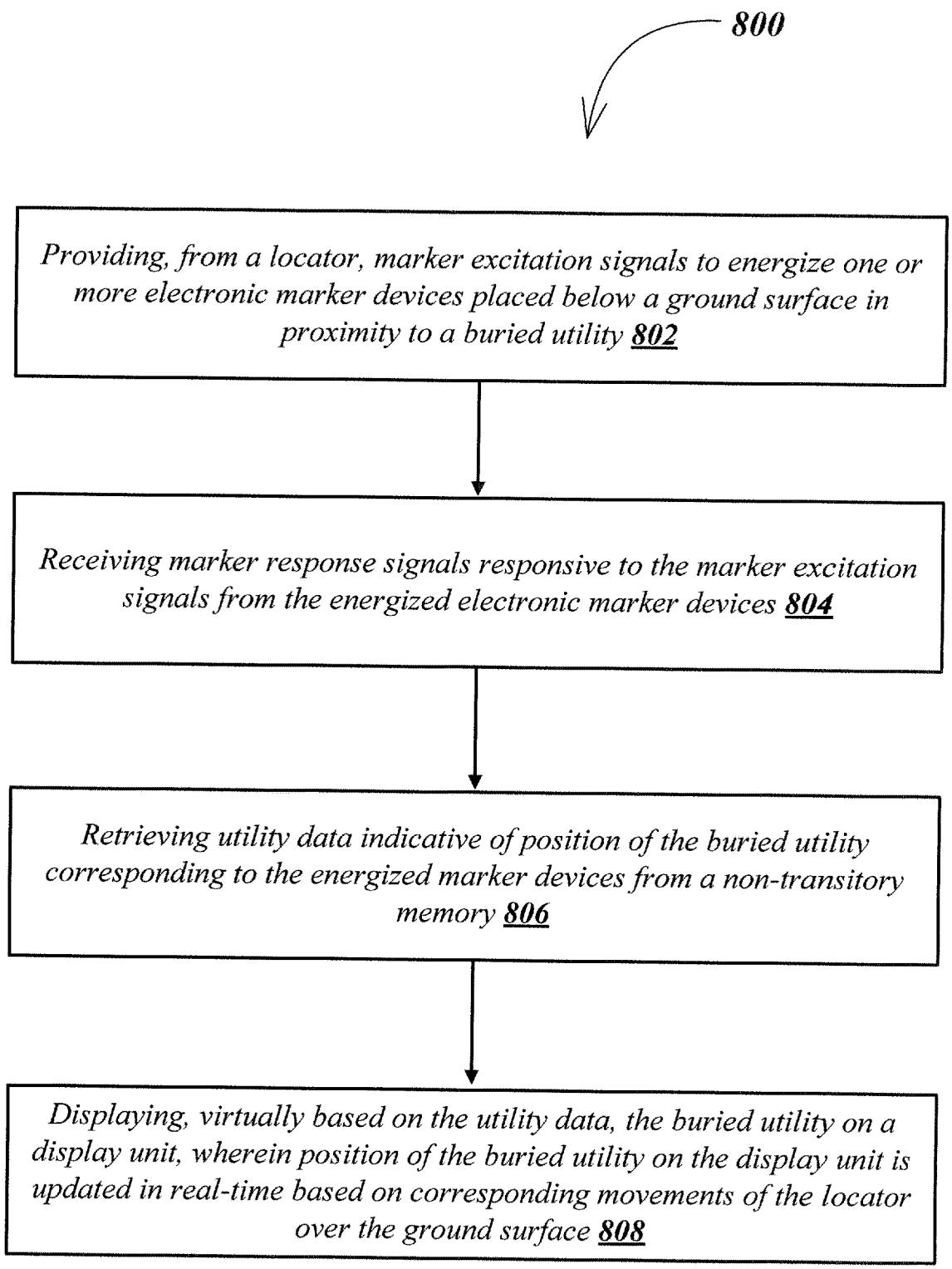
FIG. 8 illustrates an embodiment of a method for locating electronically marked buried utilities and virtually displaying located buried utilities.

FIG. 8 illustrates details of a method 800 for locating electronically marked buried utilities. In some embodiments, the method 800 may be implemented in a locating device, marking device, computing device or a combination thereof. For example, the method 800 may be implemented in a locating device, such as the locator 102 equipped with a marker excitation device 104, or other locators with integrated, standalone, or attachment marker excitation devices. Further, the method 800 either in entirety or certain blocks/steps may be described within the locating/marking/computing device in the general context of computer executable instructions, which may include routines, programs, objects, components, data structures, procedures, modules, functions, etc., that perform particular functions or implement particular data types. In some aspects, one or more of the blocks/steps of the method 800 may be executed on multiple devices such as locating device, marking device, and other computing device(s), operably coupled to perform the method 800. The order in which the method 800 is described is not intended to be construed as a limitation, and any number of the described method blocks can be combined in any order to implement the method 800, or alternative methods. Additionally, individual blocks may be deleted from the method 800 without departing from the spirit and scope of the subject matter described herein.

The method 800 may be initiated at block 802, where the method includes providing marker excitation signals to energize one or more electronic marker devices placed below a ground surface in proximity to a buried utility. Such marker excitation signals may be radio frequency continuous wave (CW) signals or pulsed signals or data signals generated by the marker excitation device 104 to energize one or more marker devices placed in or under the ground surface in proximity to the buried utility. In one aspect, the marker excitation device 104 associated with the locator 102 may generate and provide the marker excitation signals 114 to the marker devices 106 to energize the marker devices 106, and/or transmit data thereto. In one embodiment, the marker excitation signals may be generated at a first predefined frequency.

At block 804, the method may include receiving marker response signals responsive to the marker excitation signals from the energized electronic marker devices. One or more antennas 210 within the locator 102 may receive the marker response signals 116 from the marker devices 106 (which may be generated by the marker devices in response to the marker excitation signals). For example, a transceiver circuitry within the marker device 106 (that is operatively coupled to the antenna within marker device 106) may receive the marker excitation signals, which may be processed to power the marker device from the received marker excitation signals to generate corresponding marker response signals. In one embodiment, the marker response signals may be generated at a second predefined frequency, which may be the same or different from the first predefined frequency of the marker excitation signals. The one or more antennas 210 associated with the locator 102 may then receive the marker response signals 116 from the marker device 106.

At block 806, the method may include retrieving utility data, indicative of the position of the buried utility, corresponding to the energized marker devices from a non-transitory memory. The locator 102 may process the marker response signals to determine marker device data associated with the energized marker devices, and may subsequently retrieve utility data (e.g., position including positional coordinates, depth and orientation of the buried utility relative to the ground, characteristics of the buried utility, and the like) corresponding to the marker device data from a non-transitory memory, which may be a local memory of the locator or a remote non-transitory memory (if data does not exist in the local memory).

At block 808, the method may include displaying, virtually, based on the utility data, the buried utility on a display unit of the locator and/or user device. In some embodiments position of the buried utility on the display unit may be updated in real-time based on corresponding movements of the locator above the ground surface.

Figure 9:
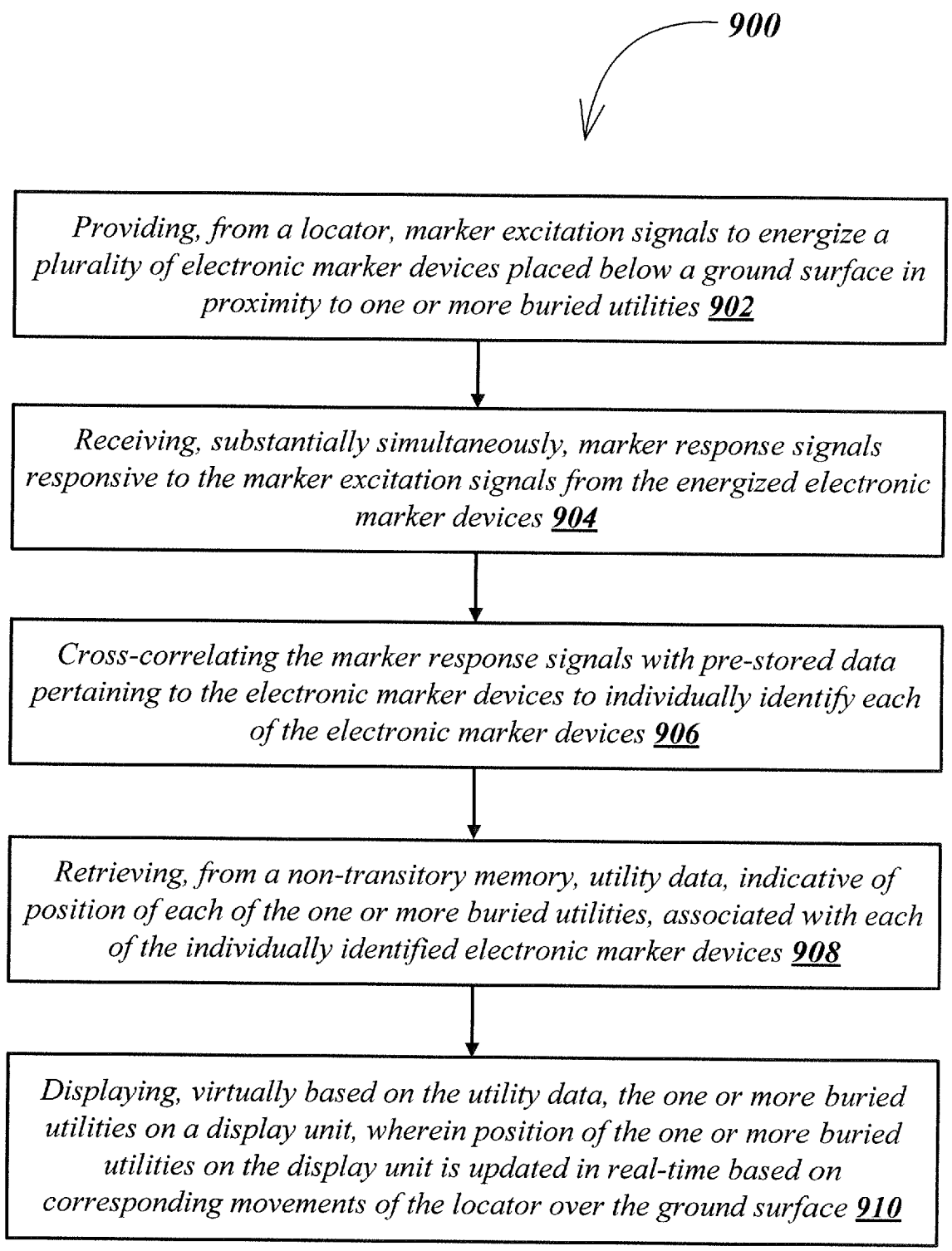
FIG. 9 illustrates another embodiment of a method for locating electronically marked buried utilities and virtually displaying located buried utilities.

FIG. 9 illustrates details of a method 900 for locating electronically marked buried utilities.

In some embodiments, the method 900 may be implemented in a locating device, such as the locator 102 equipped with a marker excitation device 104, or other locators with integrated, standalone, or attachment marker excitation devices. Further, the method 900 either in entirety or certain blocks/steps may be described within the locating device in the general context of computer executable instructions, which may include routines, programs, objects, components, data structures, procedures, modules, functions, etc., that perform particular functions or implement particular data types. The order in which the method 900 is described is not intended to be construed as a limitation, and any number of the described method blocks can be combined in any order to implement the method 900, or alternative methods. Additionally, individual blocks may be deleted from the method 900 without departing from the spirit and scope of the subject matter described herein.

The method 900 may be initiated at block 902, where the method may include providing marker excitation signals to excite a plurality of electronic marker devices placed below a ground surface in proximity to one or more buried utilities. A marker excitation device associated with a locator may generate and provide marker excitation signals to the marker devices to energize the marker devices. The marker excitation signal may be a radio frequency continuous wave (CW) signal or pulsed signals or data encoded signals generated by the marker excitation device to energize the marker devices placed in or under the ground surface in proximity to corresponding buried utilities and/or communicate data thereto.

At block 904, the method may include receiving, substantially simultaneously, marker response signals responsive to the marker excitation signals from the electronic marker devices. One or more antennas within the locator may receive the marker response signals from the marker devices (the response signal generated by the marker device in response to the marker excitation signals).

At block 906, the method may include cross-correlating marker response signals with pre-stored data pertaining to the electronic marker devices to individually identify the electronic marker devices. The cross-correlation module within the locator 102 may cross-correlate the marker response signals with the serial codes of the marker devices and their corresponding digital representations to individually identify each of the marker devices.

At block 908, the method may include retrieving, from a non-transitory memory, utility data indicative of position of each of the one or more buried utilities, associated with each of the individually identified marker devices. The non-transitory memory may be a local memory of the locator or a remote non-transitory memory (if the utility data does not exist in the local memory).

At block 910, the method may include displaying, virtually, based on the utility data, the one or more buried utilities on a display unit of the locator and/or the user device, where position of the buried utilities on a display unit may be updated in real-time based on corresponding movements of the buried utility locator above the ground surface.

In some configurations, the apparatus, circuit, modules, or systems described herein may include means for implementing features or providing functions described herein related to integrated locators, marker devices, marker device excitation transceivers, and related devices, components, methods, and systems. In one aspect, the aforementioned means may be a module comprising a processing element including a processor or processors, associated memory and/or other electronics in which embodiments of the invention reside, such as to implement signal reception, signal processing, switching, signal transmission, or other functions to process and/or condition transmitter outputs, locator inputs, filter received signals, and/or provide other electronic functions described herein. These may be, for example, modules or apparatus residing in buried object integrated locators, marker devices, marker device excitation devices or receiver devices, and/or other related equipment, devices, or systems.

In one or more exemplary embodiments, the electronic functions, methods and processes described herein and associated with integrated locators and marker devices may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. As used herein, computer program products comprising computer-readable media include all forms of computer-readable media except to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known or developed in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The scope of the present invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the invention. Thus, the presently claimed invention is not intended to be limited to the aspects shown herein, but is to be accorded the widest scope consistent with the appended Claims and their equivalents.

We claim:

1. A system for electronically marking buried utilities, comprising:
   an electronic marker device placed below a ground surface in proximity to a buried utility;
   a buried utility locator including:
   a marker excitation device to generate and provide a marker excitation signal to the electronic marker device;
   a locator front-end subsystem to receive a marker response signal from the electronic marker device responsive to the marker excitation signal and magnetic field signals emitted from the buried utility; and
   a locator processing element to process the received marker response signal obtained from the electronic marker device to generate marker device data indicative of identity and/or position of the placed electronic marker device, and further process the magnetic field signals obtained from the buried utility locator to generate utility data indicative of position of the buried utility relative to the ground surface;
   a remote computing device communicatively coupled to the buried utility locator, including a remote computing device processing element and an association module coupled to the remote computing device processing element, the association module being configured to receive the generated marker device data and the utility data from the buried utility locator, associate the marker device data to the utility data, and store the associated marker device data and the utility data into a non-transitory memory associated with the remote computing device such that the utility data is retrievable from the non-transitory memory based in part on the marker device data; and
   a display unit for virtually displaying the buried utility based on the utility data associated with the buried utility locator, wherein the position of the buried utility is updated in real-time based on corresponding movements of the buried utility locator above the ground surface.

2. The system of claim 1, wherein the electronic marker device is a passive wireless marker device.

3. The system of claim 1, wherein the electronic marker device comprises an electrical circuit and an antenna coupled to the electrical circuit.

4. The system of claim 1, wherein the marker excitation device is disposed in proximity to locator antennas in the locator front-end subsystem, and wherein the marker excitation device comprises an electrical circuit mounted on an inside portion of a marker ring and an antenna coiled around an outer peripheral region of the marker ring with its ends connected to the electrical circuit.

5. The system of claim 1, wherein the electronic marker device is placed in the ground surface with a central axis of the loop antenna substantially tangential to the ground surface.

6. The system of claim 1, wherein the electronic marker device is placed below the ground surface offset from the buried utility.

7. The system of claim 1, wherein the buried utility comprises a non-conductive material.

8. The system of claim 1, wherein the marker device data comprises at least one of a serial code associated with the electronic marker device and positional coordinates of the marker device relative to the ground surface.

9. The system of claim 1, wherein the utility data comprises position, including positional coordinates, depth and orientation of the buried utility relative to the ground surface.

10. The system of claim 1, wherein the buried utility locator further comprises a position sensing module configured to generate positional coordinates of the marker device based on the marker response signal and positional coordinates of the buried utility based on the magnetic field signals.

11. A method for electronically marking buried utilities, comprising:
    obtaining marker device data indicative of position and/or identity of an electronic marker device placed below a ground surface in proximity to a buried utility and utility data indicative of position of the buried utility relative to the ground surface;
    associating the obtained marker device data to the utility data;
    storing the associated marker device data and the utility data in a non-transitory memory associated with a remote computing device such that the utility data is retrievable from the non-transitory memory based in part on the marker device data; and
    displaying, virtually based on the utility data, the buried utility on a display unit associated with a buried utility locator, wherein the position of the buried utility on the display unit is updated in real-time based on corresponding movements of the buried utility locator above the ground surface.

12. The method of claim 11, further comprising:
    generating relative positioning data indicative of a position of the buried utility relative to the position of the electronic marker device;
    associating the relative positioning data with the marker device data; and
    storing the associated relative positioning data in the non-transitory memory such that the relative positioning data is retrievable from the non-transitory memory based in part on the marker device data.

13. The method of claim 11, further comprising downloading at least a portion of the associated marker device data and the utility data from the remotely located non-transitory memory into a local memory associated with a buried utility locator such that the utility data is retrievable from the local memory based in part on the marker device data.

14. The method of claim 13, further comprising synchronizing, periodically, the downloaded portion of the associated marker device data and the utility data with the non-transitory memory.

15. A method of locating electronically marked buried utility assets, comprising:
    providing, from a buried utility locator, a marker excitation signal to energize one or more electronic marker devices placed below a ground surface in proximity to a buried utility;
    receiving, at the buried utility locator, marker response signal responsive to the marker excitation signal from the energized electronic marker devices;

retrieving utility data indicative of position of the buried utility corresponding to the energized marker devices from a non-transitory memory associated with the buried utility locator; and displaying, virtually based on the utility data, the buried utility on a display unit associated with the buried utility locator, wherein the position of the buried utility on the display unit is updated in real-time based on corresponding movements of the buried utility locator above the ground surface.

16. The method of claim 15, wherein the buried utility comprises a non-conductive material.

17. The method of claim 15, wherein the non-transitory memory is a local memory of the buried utility locator comprising pre-loaded utility data associated with the electronic marker device.

18. The method of claim 17, wherein the pre-loaded utility data in the local memory of the buried utility locator is synchronized with the utility data stored in the non-transitory memory.

19. The method of claim 15, wherein the position of the buried utility comprises at least one of an absolute position of the buried utility with respect to the ground surface and the relative position of the buried utility with respect to the electronic marker devices.

20. The method of claim 15, further comprising calibrating the buried utility locator according to a two stage calibration method.

21. A method of locating electronically marked buried utility assets, comprising:

providing marker excitation signals to excite a plurality of electronic marker devices placed below a ground surface in proximity to one or more buried utilities;

receiving, substantially simultaneously, marker response signals responsive to the marker excitation signals from the plurality of electronic marker devices;

cross-correlating the marker response signals with pre-stored data pertaining to the electronic marker devices to individually identify each of the electronic marker devices;

retrieving, from a non-transitory memory, utility data, indicative of position of each of the one or more buried utilities relative to the ground surface, associated with each of the individually identified electronic marker devices; and displaying, virtually based on the utility data, the buried utility on a display unit associated with the buried utility locator, wherein the position of the buried utility on the display unit is updated in real-time based on corresponding movements of the buried utility locator above the ground surface.

22. The method of claim 21, wherein the buried utility comprises a non-conductive material.

* * * * *